(12) United States Patent
Pepin et al.

(10) Patent No.: US 12,136,977 B2
(45) Date of Patent: *Nov. 5, 2024

(54) SYSTEMS AND METHODS FOR BEAMFORMING IN HYBRID BEAMFORMING ANTENNAS

(71) Applicant: Space Exploration Technologies Corp., Hawthorne, CA (US)

(72) Inventors: Eric Pepin, Seattle, WA (US); Kim W. Schulze, Seattle, WA (US); Amir Agah, Kirkland, WA (US); Dean A. De Carli, Seattle, WA (US); Philippe Riondet, Laguna Hills, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,597

(22) Filed: May 15, 2023

(65) Prior Publication Data

US 2023/0283338 A1 Sep. 7, 2023

Related U.S. Application Data

(63) Continuation of application No. 17/703,831, filed on Mar. 24, 2022, now Pat. No. 11,652,525.

(Continued)

(51) Int. Cl.
*H04B 7/06* (2006.01)
*H04B 17/11* (2015.01)

(52) U.S. Cl.
CPC ......... *H04B 7/0617* (2013.01); *H04B 7/0686* (2013.01); *H04B 17/11* (2015.01)

(58) Field of Classification Search
CPC .... H04B 7/0617; H04B 7/0686; H04B 17/11; H01Q 3/36; H01Q 21/065
(Continued)

(56) References Cited

U.S. PATENT DOCUMENTS 11,652,525 B2 * 5/2023 Pepin .................. H01Q 21/065
375/262
2012/0033761 A1 2/2012 Guo et al.
(Continued)

*Primary Examiner* — Fitwi Y Hailegiorgis
(74) *Attorney, Agent, or Firm* — Polsinelli PC

(57) ABSTRACT

Systems, methods, and computer-readable media are provided for hybrid beamforming. An example method can include determining a plurality of digital beamforming weights associated with a plurality of digital beamforming paths between digital beamformers and groups of analog beamforming circuits in a phased array antenna, each digital beamforming path being coupled to a group of analog beamforming circuits and each analog beamforming circuit being coupled to a respective set of antenna elements of the phased array antenna, and determining analog beamforming weights associated with the groups of analog beamforming circuits. The analog beamforming weights are estimated to put analog beamforming paths associated with the groups of analog beamforming circuits in a desired phase and gain relationship with each other. The method can include varying, based at least partly on the analog beamforming weights, a signal phase shift across the analog beamforming paths associated with the groups of analog beamforming circuits.

24 Claims, 20 Drawing Sheets

Related U.S. Application Data

(60) Provisional application No. 63/167,625, filed on Mar. 29, 2021.

(58) Field of Classification Search
USPC .......................................................... 375/262
See application file for complete search history.

(56) References Cited

U.S. PATENT DOCUMENTS

| | | | |
|---|---|---|---|
| 2016/0191177 A1* | 6/2016 | Kim ....................... | H04B 17/13 375/224 |
| 2022/0045728 A1 | 2/2022 | Ma et al. | |

* cited by examiner

1100

```
┌─────────────────────────────────────────────────────────────┐
│ DETERMINE DIGITAL BEAMFORMING WEIGHTS ASSOCIATED WITH A     │
│ PLURALITY OF DIGITAL BEAMFORMING PATHS BETWEEN DIGITAL      │
│ BEAMFORMERS AND GROUPS OF ANALOG BEAMFORMING CIRCUITS       │
│              IN A PHASED ARRAY ANTENNA                      │
│                         1102                                │
└─────────────────────────────────────────────────────────────┘
                              │
                              ▼
┌─────────────────────────────────────────────────────────────┐
│  DETERMINE ANALOG BEAMFORMING WEIGHTS ASSOCIATED WITH       │
│     THE GROUPS OF ANALOG BEAMFORMING CIRCUITS               │
│                         1104                                │
└─────────────────────────────────────────────────────────────┘
                              │
                              ▼
┌─────────────────────────────────────────────────────────────┐
│  DETERMINE CALIBRATION OFFSETS ESTIMATED TO PUT ANALOG      │
│ BEAMFORMING PATHS ASSOCIATED WITH THE GROUPS OF ANALOG      │
│  BEAMFORMING CIRCUITS IN A DESIRED PHASE AND GAIN           │
│           RELATIONSHIP WITH EACH OTHER                      │
│                         1106                                │
└─────────────────────────────────────────────────────────────┘
                              │
                              ▼
┌─────────────────────────────────────────────────────────────┐
│ VARY, BASED AT LEAST PARTLY ON THE CALIBRATION OFFSETS, A   │
│ SIGNAL PHASE SHIFT ACROSS THE ANALOG BEAMFORMING PATHS      │
│  ASSOCIATED WITH THE GROUPS OF ANALOG BEAMFORMING           │
│                       CIRCUITS                              │
│                         1108                                │
└─────────────────────────────────────────────────────────────┘
```

FIG. 11

SYSTEMS AND METHODS FOR BEAMFORMING IN HYBRID BEAMFORMING ANTENNAS

CROSS-REFERENCE TO RELATED APPLICATIONS

This application is a continuation of U.S. patent application Ser. No. 17/703,831, filed on Mar. 24, 2022, entitled "SYSTEMS AND METHODS FOR BEAMFORMING IN HYBRID BEAMFORMING ANTENNAS", which claims priority to U.S. Provisional Application No. 63/167,625, filed on Mar. 29, 2021, entitled "SYSTEMS AND METHODS FOR BEAMFORMING IN HYBRID BEAMFORMING ANTENNAS", the contents of which are hereby incorporated herein in their entirety and for all purposes.

TECHNICAL FIELD

The present disclosure generally relates to wireless communications and, more specifically, determining beamforming weight offsets in hybrid beamforming antennas.

BACKGROUND

Phased array antennas are widely used in a variety of wireless communication systems such as satellite and cellular communication systems. Phased array antennas can include a number of antenna elements arranged to behave as a larger directional antenna. Advantageously, a phased array antenna can transmit or receive signals in a preferred direction (e.g., via beamforming) without physically repositioning or reorientation. However, phased array antennas can experience cross-coupling or cross-talk between antenna elements and circuitry along the signal paths. Such cross-coupling or cross-talk can have undesirable effects and can negatively impact the performance of a phased array antenna. For example, cross-coupling or cross-talk can cause interference, signal phase shifts, harmonic distortion, signal integrity losses, distortion of radiation patterns, among other issues. Accordingly, there is a need in the art for technologies and strategies to reduce, manage, and/or limit cross-coupling in phased array antennas and improve phased array antenna performance.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 11 is a flowchart illustrating an example method for hybrid beamforming, in accordance with some examples of the present disclosure.

DETAILED DESCRIPTION

Figure 1A:
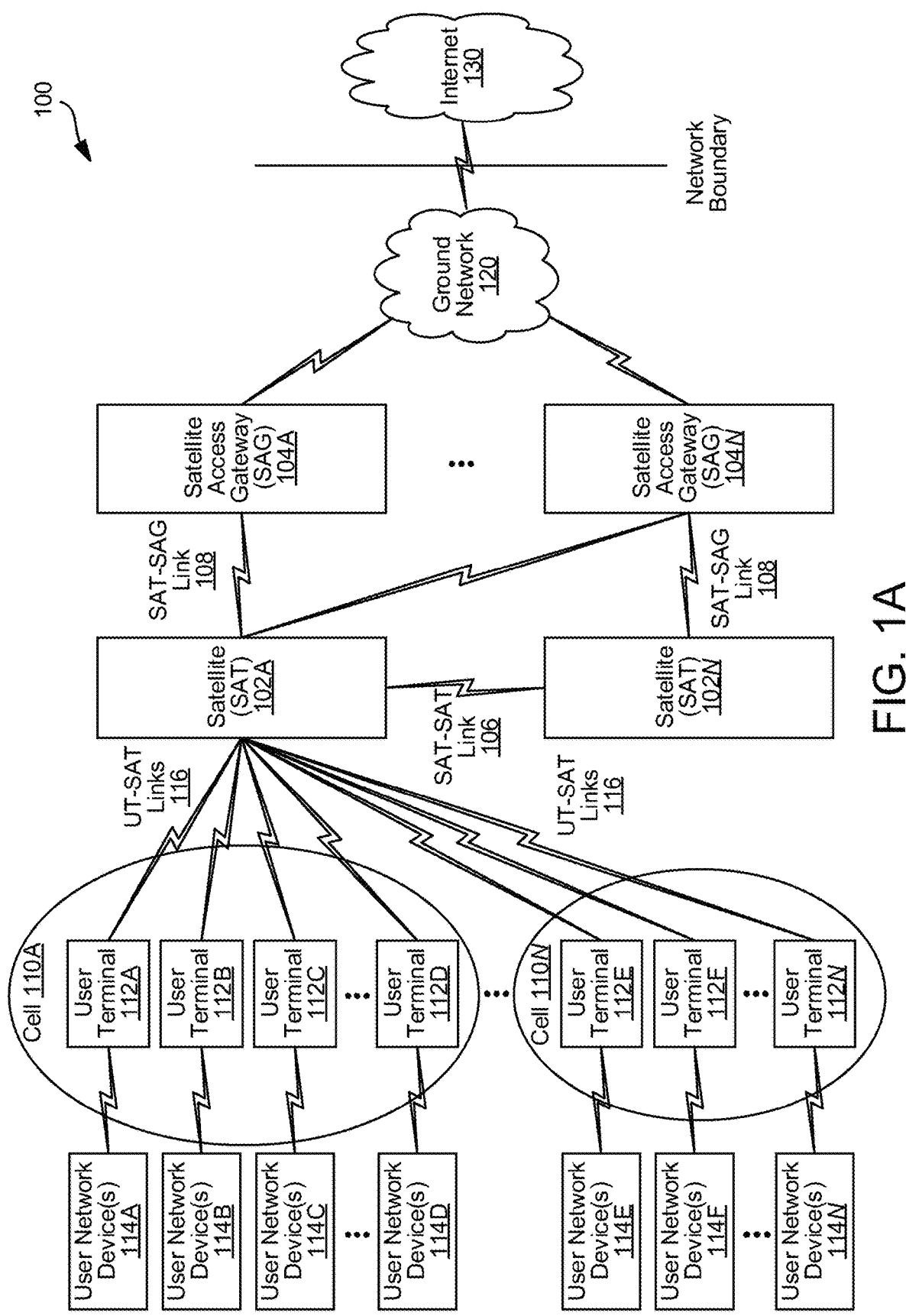
FIG. 1A is a simplified diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, a phased array antenna can be configured to implement beamforming techniques to transmit and/or receive signals in a preferred direction without physically repositioning or reorientation. In some cases, beamforming techniques can be used to mitigate the propagation path loss and increase the range of radio waves, which can otherwise be shortened by the propagation path loss. Beamforming techniques can include, for example, analog beamforming, digital beamforming, or hybrid beamforming. Hybrid beamforming combines analog beamforming with digital precoding to form desired radiation patterns at the transmit (Tx) and/or receive (Rx) side.

In some aspects, systems, apparatuses, processes (also referred to as methods), and computer-readable media (collectively referred to herein as "systems and techniques") are described herein for selecting weights for hybrid beamforming. In some examples, the systems and techniques disclosed herein can mitigate coupling non-idealities and improve the radiation pattern characteristics of a hybrid beamforming phased array antenna. The systems and techniques disclosed herein can help suppress noise contributions by baseband quantization. In some cases, the systems and techniques disclosed herein can limit the peak antenna gain of the local oscillator feedthrough (LOFT). For example, the systems and techniques disclosed herein can limit the peak antenna gain of the LOFT for transmit operations (e.g., with direct conversion).

In some examples, a hybrid beamforming architecture can include a distribution of beamforming between the radio frequency (RF)/analog and digital domains. In some cases, the systems and techniques described herein can apply, in the digital beamforming domain, an offset weight (e.g., a digital beamforming offset weight) that is cancelled/compensated by beamforming weights applied in the RF/analog domain. For example, the RF/analog beamforming weights can contain the inverse of the digital beamforming offset weight and can thus cancel the digital beamforming offset weight. In some cases, in a "hybrid-N" beamforming architecture, N number of antennas can map to a single digital beamforming path (e.g., via N:1 RF/analog beamforming), which can have a uniquely applied offset weight. The systems and techniques disclosed herein can vary the digital beamforming weight between different digital beamforming paths. By varying the digital beamforming weight between digital beamforming paths, the "common mode" weight applied in the corresponding analog/RF beamforming antenna grouping is also varied.

In some cases, if analog/RF beamforming is performed within a small integrated circuit (IC), chip, module, etc., with joint frontend operation such as gain, significant coupling impacts can occur, with the coupling victim-aggressor phase relationships depending on this common-mode weight (e.g., the common-mode phase). In configurations having a similar analog/RF beamforming common-mode phase across the phased array antenna (and/or a derivative of the desired steering direction), large sidelobes in the resulting antenna radiation pattern can occur due to repeated sub-arrays having similar coupling victim-aggressor phase relationships. For Tx operations, such large sidelobes (or grating lobes) can be problematic for limiting interference with other users/operators (e.g., due to high radiated power in non-steering directions). For RX operations, the interference problem is reversed, as the receive antenna is more sensitive to outside interference from some non-steering directions.

The systems and techniques disclosed herein can vary the common-mode phase between analog/RF beamforming groups. For example, the systems and techniques disclosed herein can vary the common-mode phase between analog/RF beamforming groups by randomizing the phase of the inverse offset weights across digital beamforming paths. By adequately varying the common-mode phase between analog/RF beamforming groupings, the coupling victim-aggressor phase relationship can also be varied/randomized between analog/RF beamforming groupings, effectively spreading the previously-mentioned large sidelobe power across all pointing directions and mitigating the Rx/Tx interference concerns. Such approaches can effectively mitigate RF/analog beamforming coupling impacts without placing requirements on calibration weight offsets, which can be applied by the analog/RF beamforming weights or a combination of analog/RF beamforming weights and digital beamforming weights.

In some examples, each Tx digital beamforming path can have a digital-to-analog converter (DAC) and each Rx digital beamforming path can have an analog-to-digital converter (ADC). On the digital side of a DAC or ADC, there is defined bit width that sets the number of quantization levels of the converter, and the quantization noise power added by the converter. For example, a quantization error can appear like noise (e.g., can be similar to and/or have similar effects as noise) if the converted signal has certain characteristics such as being non-periodic. The quantization error is a function of the input signal into the converter. Therefore, across a Tx hybrid beamforming phased array antenna, if the digital input to each DAC is the same across digital beamforming paths, the quantization error produced by each DAC will also be the same. The quantization error can then see the same beamforming weighting as the signal, and can be beamformed in the same direction as the signal with the full array gain.

In this example scenario, the in-band and out-of-band "noise" levels of the transmitted signal may be dominated by the DAC quantitation noise power. However, if the digital beamforming weighting of the signal pre-DAC is adequately varied from path to path (e.g., as described herein), the quantization error between paths can be de-correlated. Therefore, even if each analog/RF beamforming sub-array beamforms its respective quantization error in the signal steering angle direction, it may not sum completely "in-voltage" over-the-air with the beamformed quantization error from other sub-arrays. If the quantization error between digital beamforming paths is de-correlated, summing between sub-arrays may be "in-power". Any deviation for pure voltage summing (e.g., as the beamformed signal sees) can suppress the over-the-air in-band and out-of-band noise contribution by the DAC quantization, thus relaxing DAC performance parameters and/or constraints such as, for example, number of bits, over-sampling rate, etc.

Likewise, the in-band and out-of-band "noise" levels of the transmitted signal may be dominated by the ADC quantitation noise power. However, if the beamforming weighting of the signal pre-converter is adequately varied from path to path (e.g., as described herein), the quantization error between paths can be de-correlated. Therefore, in some examples, even if each analog/RF beamforming sub-array beamforms its respective quantization error in the signal steering angle direction, it may not sum completely "in-voltage" over-the-air with the beamformed quantization error from other sub-arrays. If the quantization error between beamforming paths is de-correlated, summing between sub-arrays may be "in-power". Any deviation for pure voltage summing (e.g., as the beamformed signal sees) can suppress the over-the-air in-band and out-of-band noise contribution by the ADC quantization, thus relaxing ADC performance parameters and/or constraints such as, for example, number of bits, over-sampling rate, etc.

In an example hybrid beamforming architecture, frequency translation can be performed between analog/RF beamforming and the DAC/ADC of the digital beamformer path. In some cases, for Tx operations, if direct-conversion is used, local-oscillator feed-through (LOFT) can be generated by an imbalance at the mixing stage. The LOFT can be subsequently beamformed in the same direction as the signal within the corresponding analog/RF beamforming sub-array. However, the antenna gain of the LOFT (and the direction of the gain) can depend on the relative LOFT weighting (e.g., phasing) between the RF/analog beamforming sub-arrays. In some cases, controlling and/or determining the relative phasing of the LOFT between sub-arrays, especially after performing "LOFT calibration" (e.g., where a possible random mixing imbalance is corrected, with possibly random error), can be difficult.

If the LOFT phasing between sub-arrays has some deterministic/periodic/repeated structure, the LOFT may see a significant antenna gain at some direction with significant angle-offset from the signal steering direction (and variation in such from one antenna to the next). In some cases, the resulting "LOFT beam" can interfere with other users/operators (e.g., much like sidelobes of the signal beam). If the digital beamforming phasing of the signal is randomized from path to path as described herein (e.g., for RF/analog beamforming coupling mitigation), with the inverse weighting applied in the RF/analog beamforming weights, the LOFT may only see the RF/analog beamforming weights, which have random common-mode phase variation between sub-arrays. For an "N-Hybrid" phased array antenna with M antenna elements, where N<<M, the peak gain of the resulting LOFT antenna gain pattern can be predictable and independent of (or largely independent of) the intrinsic relative LOFT phasing. However, this predicable peak gain value can allow the LOFT dBc performance of a direct conversion path (e.g., the total conducted LOFT power) to be specified to satisfy interference requirements, objectives, and/or parameters, which in some cases may be based on Effective Isotopically Radiated Power (EIRP). The "random-phasing" antenna gain pattern can have other useful properties for scaling up N and/or scaling up M/aperture size.

Figure 12:
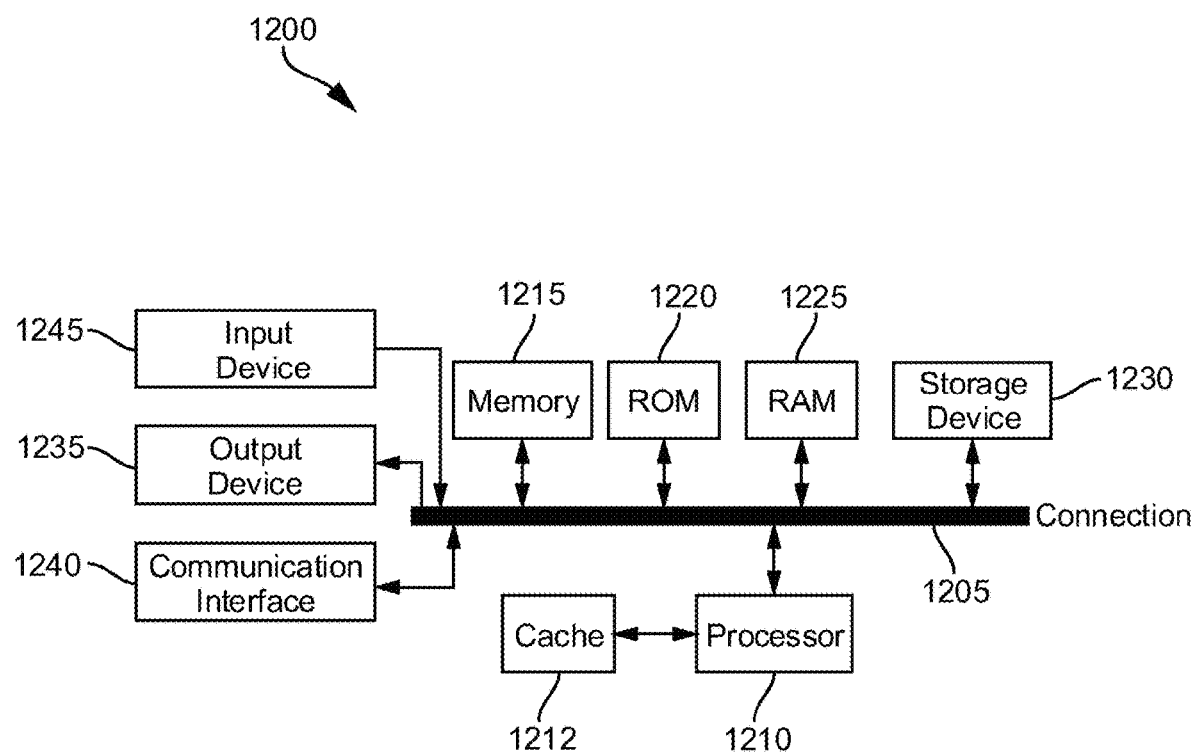
FIG. 12 is a diagram illustrating an example computing device architecture, in accordance with some examples of the present disclosure.

The disclosed systems and techniques will be described in the following disclosure as follows. The discussion begins with a description of example systems, architectures and technologies for wireless communications, example phased array antennas, and beamforming, as illustrated in FIGS. 1A through 10. A description of an example method for hybrid beamforming, as illustrated in FIG. 11, will then follow. The discussion concludes with a description of an example computing device architecture including example hardware components that can be implemented with phased array antennas and other electronic systems, as illustrated in FIG. 12. The disclosure now turns to FIG. 1A.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), and a ground network 120 in communication with a network 130, such as the Internet.

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. The SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGS 104 can perform phased-array beamforming and digital processing to support highly directive, steered antenna beams that track the SATs 102. Moreover, the user terminals 112 and/or the SAGs 104 can use one or more frequency bands to communicate with the SATs 102, such as the Ku and/or Ka frequency bands.

The user terminals 112 can be used to connect the user network devices 114 to the SATs 102 and ultimately the Internet 130. The SAGS 104 can be used to connect the ground network 120 and the Internet 130 to the SATs 102. For example, the SAGs 104 can relay communications from the ground network 120 and/or the Internet 130 to the SATs 102, and communications from the SATs 102 (e.g., communications originating from the user network devices 114, the user terminals 112, or the SATs 102) to the ground network 120 and/or the Internet 130.

The user network devices 114 can include any electronic devices with networking capabilities and/or any combination of electronic devices such as a computer network. For example, the user network devices 114 can include routers, network modems, switches, access points, smart phones, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles or devices, user networks, etc. The ground network 120 can include one or more networks and/or data centers. For example, the ground network 120 can include a public cloud, a private cloud, a hybrid cloud, an enterprise network, a service provider network, an on-premises network, and/or any other network.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the ground network 120 and ultimately the Internet 130. For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to the ground network 120, which can connect the SAGS 104A-N to the Internet 130. Thus, the communication links 108 and 116, the SAT 102A, the SAG 104A, the user terminals 112A-D and/or 112E-N and the ground network 120 can allow the user network devices 114A-D and/or 114E-N to connect to the Internet 130.

In some examples, a user can initiate an Internet connection and/or communication through a user network device from the user network devices 114. The user network device can have a network connection to a user terminal from the user terminals 112, which it can use to establish an uplink (UL) pathway to the Internet 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the ground network 120 and, by extension, the Internet 130. Thus, the particular SAG can enable the Internet connection and/or communication from the user network device to the ground network 120 and, by extension, the Internet 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the Internet 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
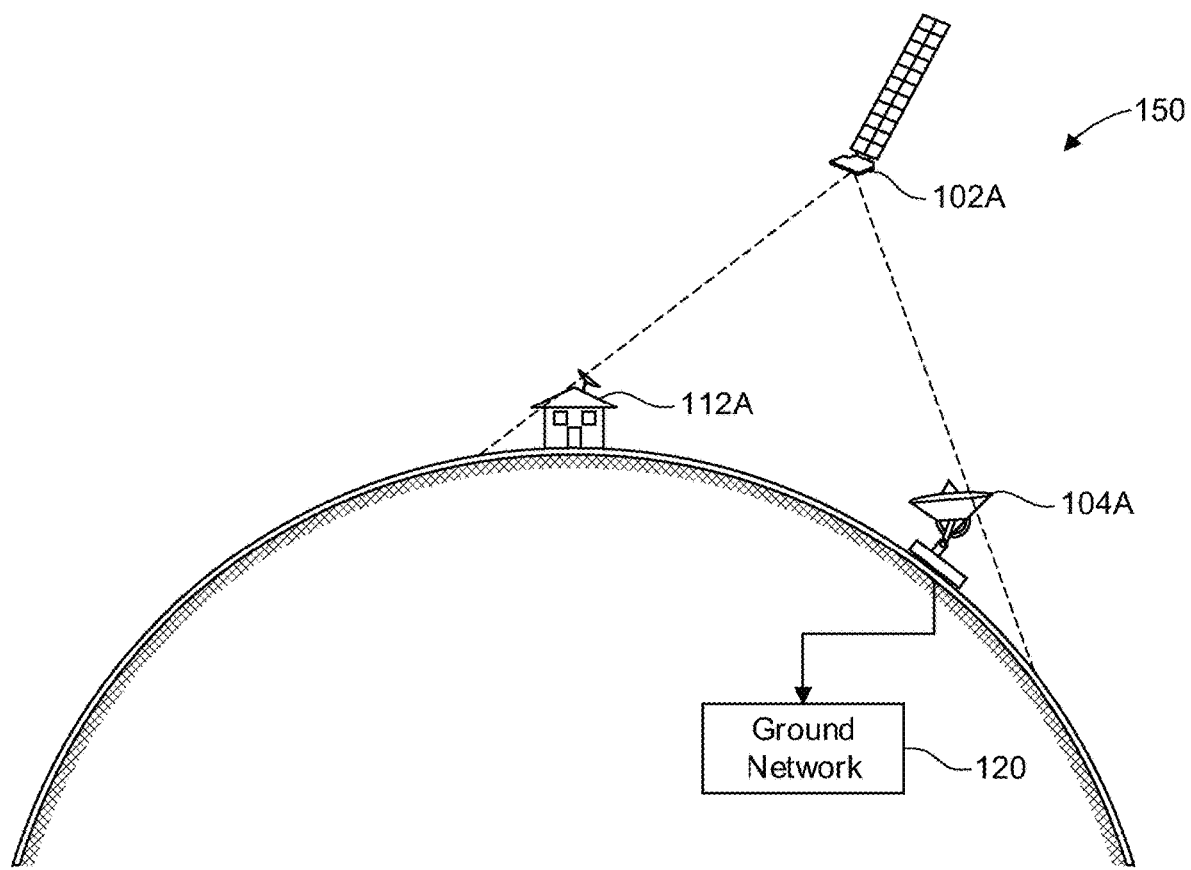
FIG. 1B is a simplified diagram illustrating an example of communication in a satellite communication system, in accordance with some examples of the present disclosure.

FIG. 1B is a diagram illustrating an example of an antenna and satellite communication system 150 in accordance with some examples of the present disclosure. As shown in FIG. 1B, an Earth-based UT 112A is installed at a location directly or indirectly on the Earth's surface such as a house, building, tower, vehicle, or another location where it is desired to obtain communication access via a network of satellites.

A communication path may be established between the UT 112A and SAT 102A. In the illustrated example, the SAT 102A, in turn, establishes a communication path with a SAG 104A. In another example, the SAT 102A may establish a communication path with another satellite prior to communication with SAG 104A. The SAG 104A may be physically connected via fiber optic, Ethernet, or another physical connection to a ground network 120. The ground network 120 may be any type of network, including the Internet. While one satellite is illustrated, communication may be with and between a constellation of satellites.

Figure 2A:
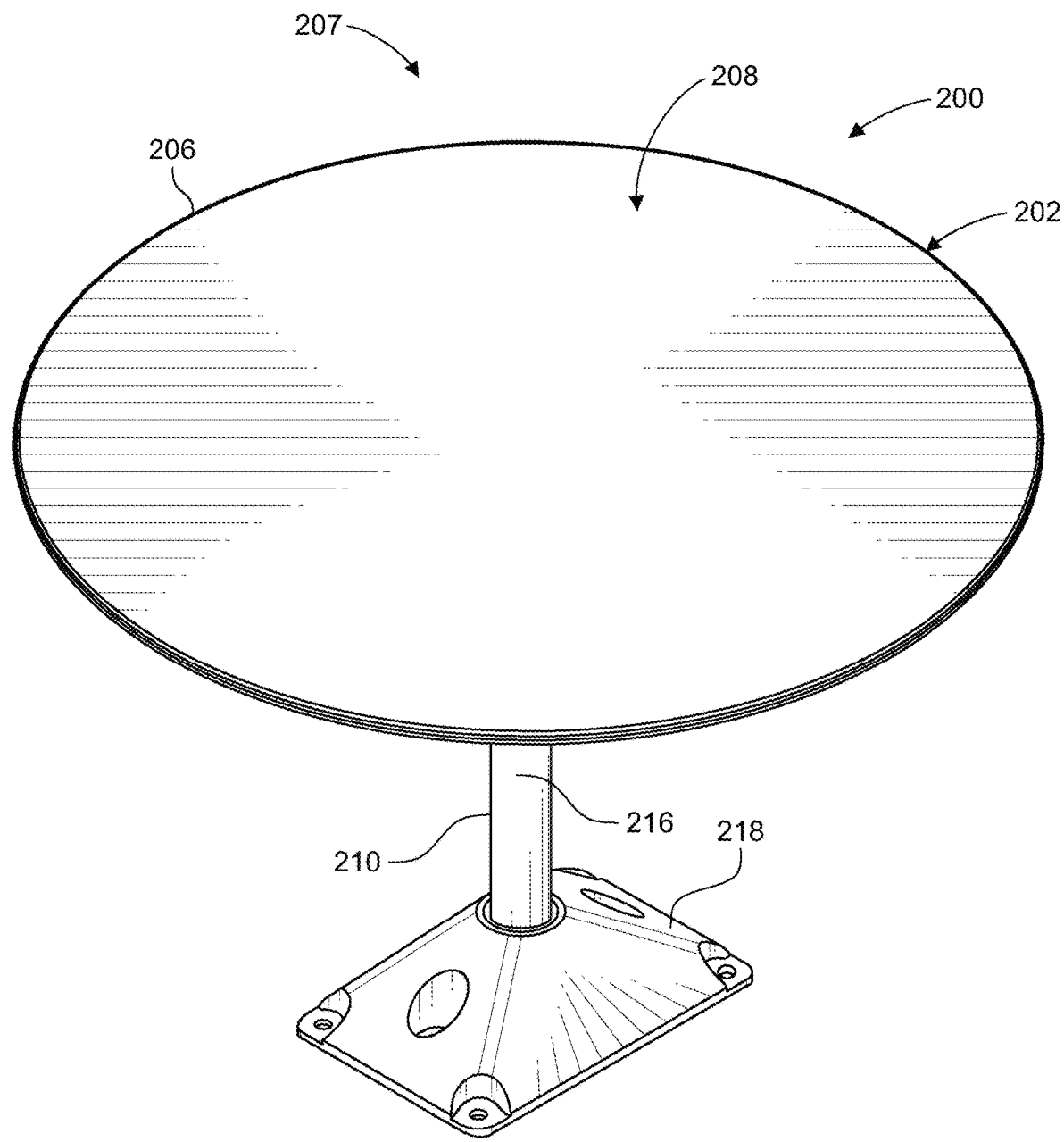
FIGS. 2A and 2B are isometric top and bottom views depicting an exemplary antenna apparatus, in accordance with some examples of the present disclosure.
Figure 2B:
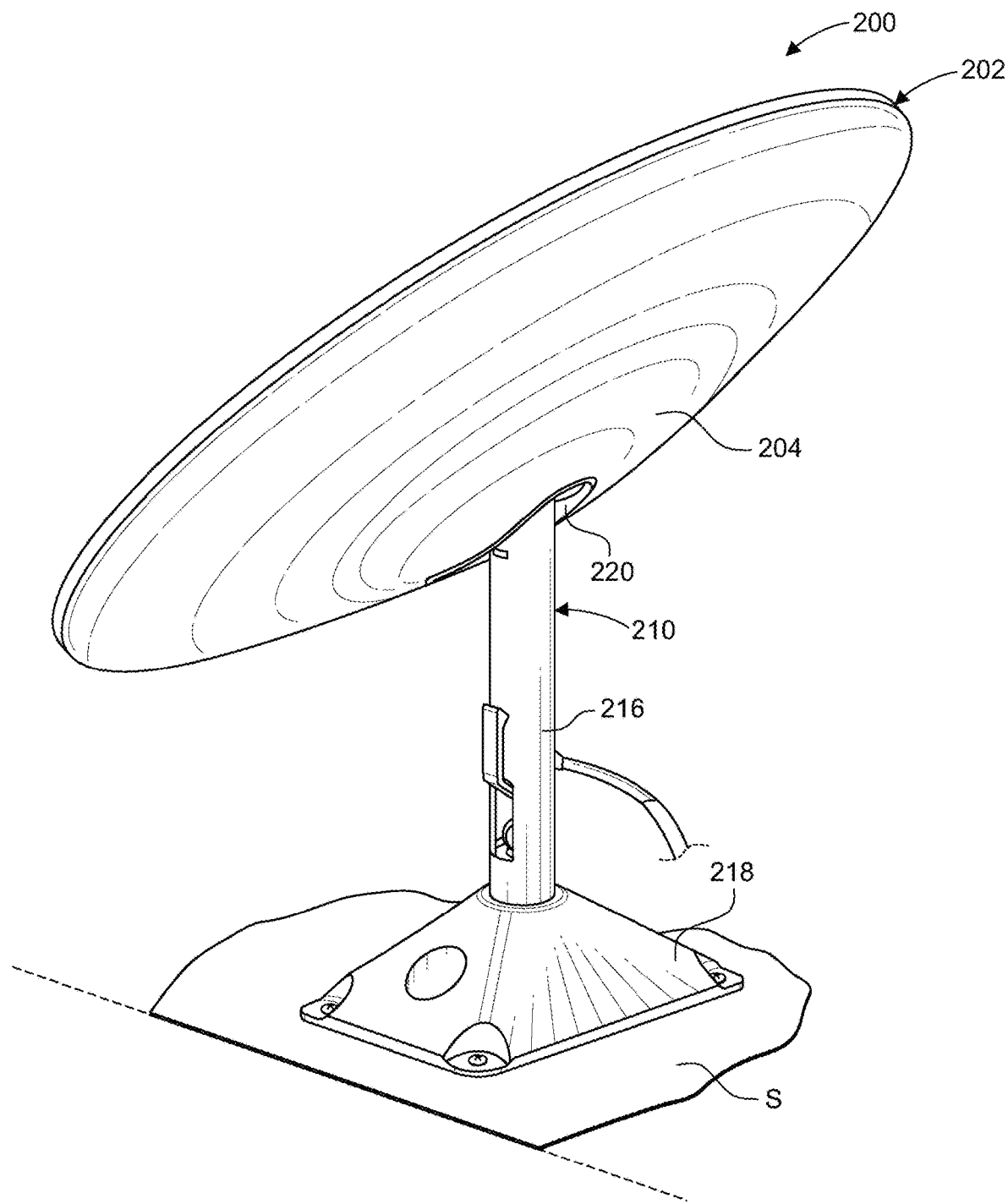

In some examples, the UT 112A may include an antenna system disposed in an antenna apparatus 200, for example, as illustrated in FIGS. 2A and 2B, designed for sending and/or receiving radio frequency signals to and/or from a satellite or a constellation of satellites. FIG. 2A illustrates an example top view of the antenna apparatus 200. The antenna apparatus 200 may include an antenna aperture 208 defining an area for transmitting and receiving signals, such as a phased array antenna system or another antenna system. The antenna apparatus 200 may include a top enclosure 207 that couples to a radome portion 206 to define a housing 202. The antenna apparatus 200 can also include a mounting system 210 having a leg 216 and a base 218.

FIG. 2B illustrates a perspective view of an underside of the antenna apparatus 200. As shown, the antenna apparatus 200 may include a lower enclosure 204 that couples to the radome portion 206 to define the housing 202. In the illustrated example, the mounting system 210 includes a leg 216 and a base 218. The base 218 may be securable to a surface S and configured to receive a bottom portion of the leg 216. A tilting mechanism 220 (details not shown) disposed within the lower enclosure 204 permits a degree of tilting to point the face of the radome portion 206 at a variety of angles for optimized communication and for rain and snow run-off.

Figure 3A:
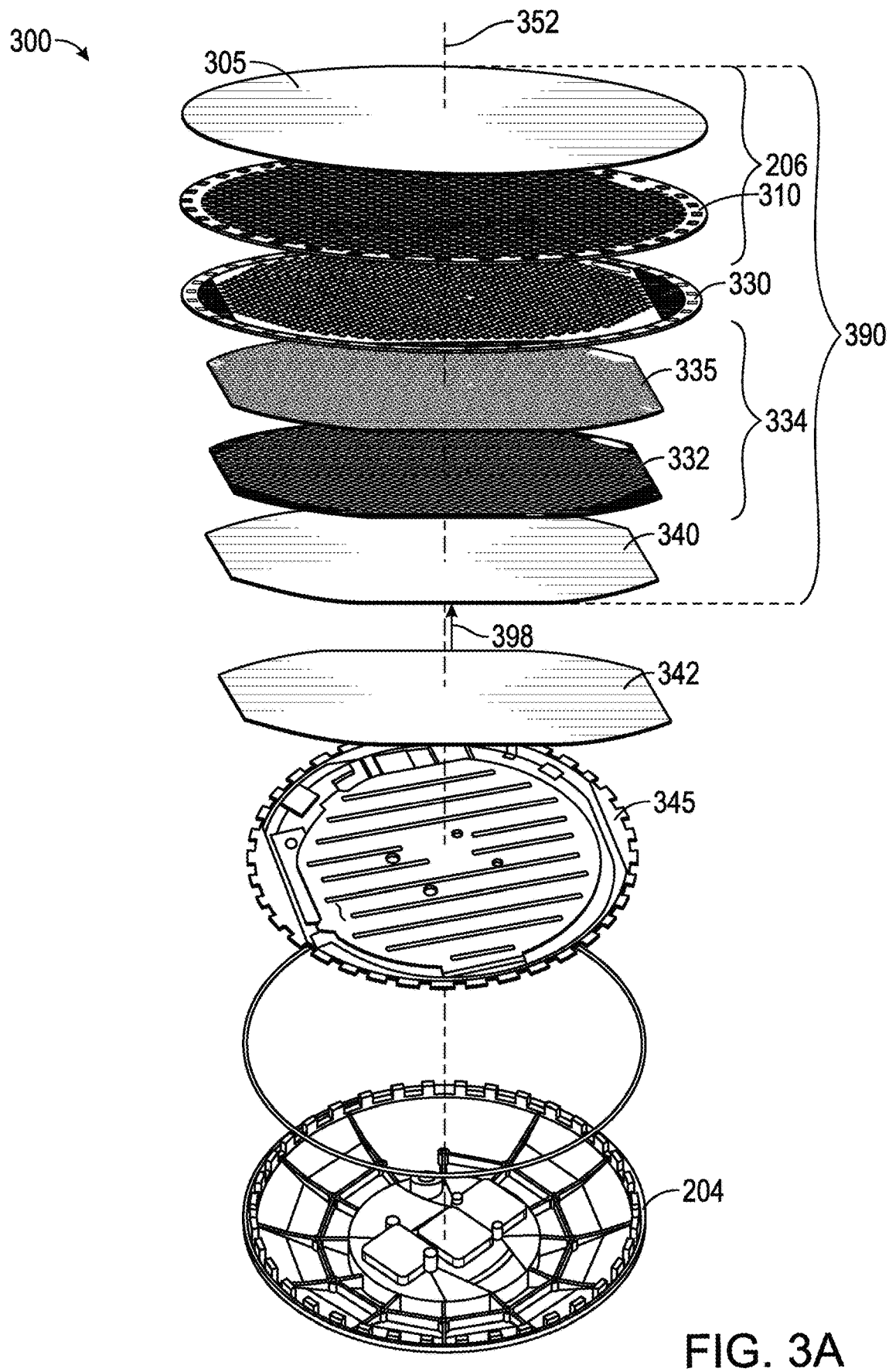
FIG. 3A is an isometric exploded view depicting an exemplary antenna apparatus including the housing and the antenna stack assembly, in accordance with some examples of the present disclosure.

Referring to FIG. 3A, an antenna stack assembly 300 can include a plurality of antenna components, which can include a printed circuit board (PCB) assembly 342 configured to couple to other electrical components disposed within the housing 202 (including lower enclosure 204 and radome portion 206). In the illustrated example, the antenna stack assembly 300 includes a phased array antenna assembly including a plurality of individual antenna elements configured in an array. The components of the phased array antenna assembly 334 may be mechanically and electrically supported by the PCB assembly 342.

Figure 3B:
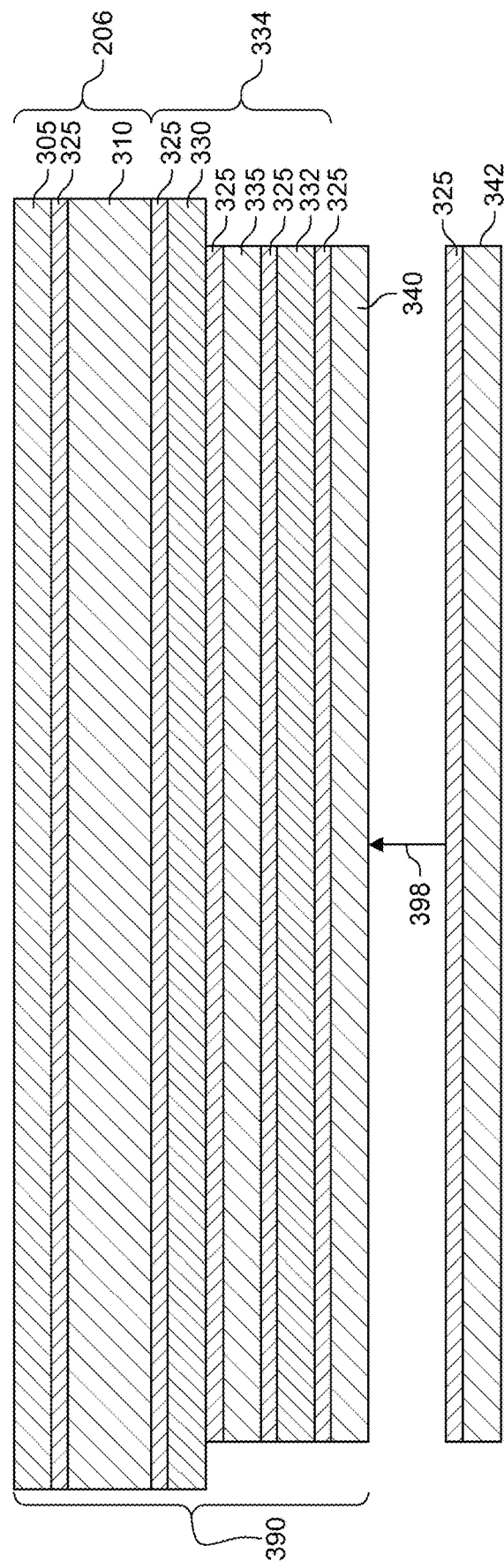
FIG. 3B is a cross-sectional view of an antenna stack assembly of an antenna apparatus, in accordance with some examples of the present disclosure.

In the illustrated example of FIGS. 3A and 3B, the layers in the antenna stack assembly 300 layup include a radome assembly 206 (including radome 305 and radome spacer 310), a phased array antenna assembly 334 (including upper patch layer 330, lower patch layer 332, and antenna spacer 335 in between), a dielectric layer 340, and PCB assembly 342, as will be described in greater detail below. As seen in FIG. 3B, the layers may include adhesive coupling 325 between adjacent layers.

Figure 4A:
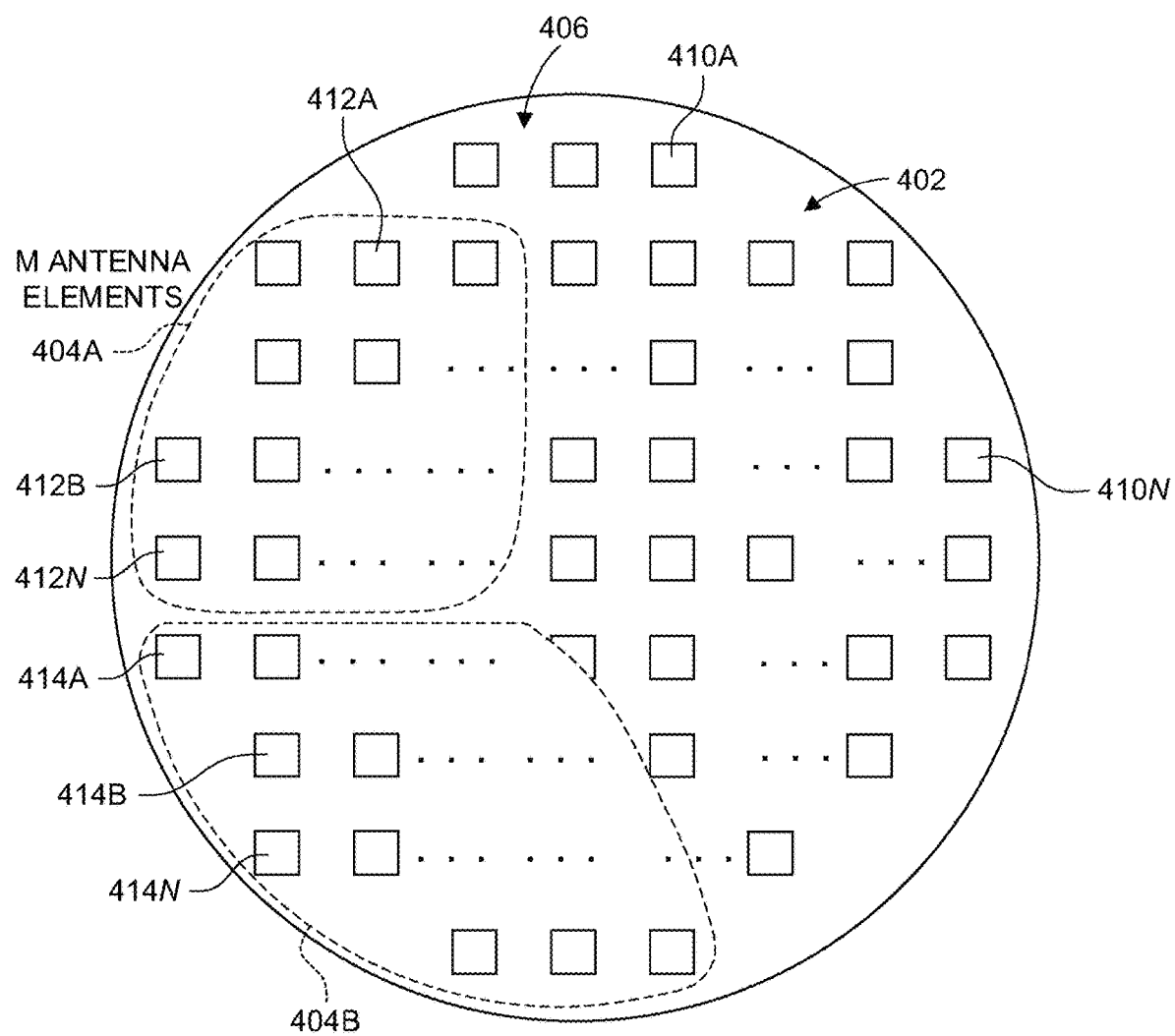
FIG. 4A is a diagram illustrating an example illustration of a top view of an antenna lattice, in accordance with some examples of the present disclosure.

FIG. 4A is a diagram illustrating an example top view of an antenna lattice 406, in accordance with some examples of the present disclosure. The antenna lattice 406 can be part of a phased array antenna system, as further described below with respect to FIGS. 4B and 4C. The antenna lattice 406 can include antenna elements 410A-N (collectively "410"), 412 A-N (collectively "412"), 414A-N (collectively "414") configured to transmit and/or send radio frequency signals. In some examples, the antenna elements 410, 412, 414 can be coupled to (directly or indirectly) corresponding amplifiers, as further described below with respect to FIGS. 4B and 4C. The amplifiers can include, for example, low noise amplifiers (LNAs) in the receiving (Rx) direction or power amplifiers (PAs) in the transmitting (Tx) direction.

An antenna aperture 402 of the antenna lattice 406 can be an area through which power is radiated or received. A phased array antenna can synthesize a specified electric field (phase and amplitude) across the aperture 402. The antenna lattice 406 can define the antenna aperture 402 and can include the antenna elements 410, 412, 414 arranged in a particular configuration that is supported physically and/or electronically by a PCB.

Figure 4B:
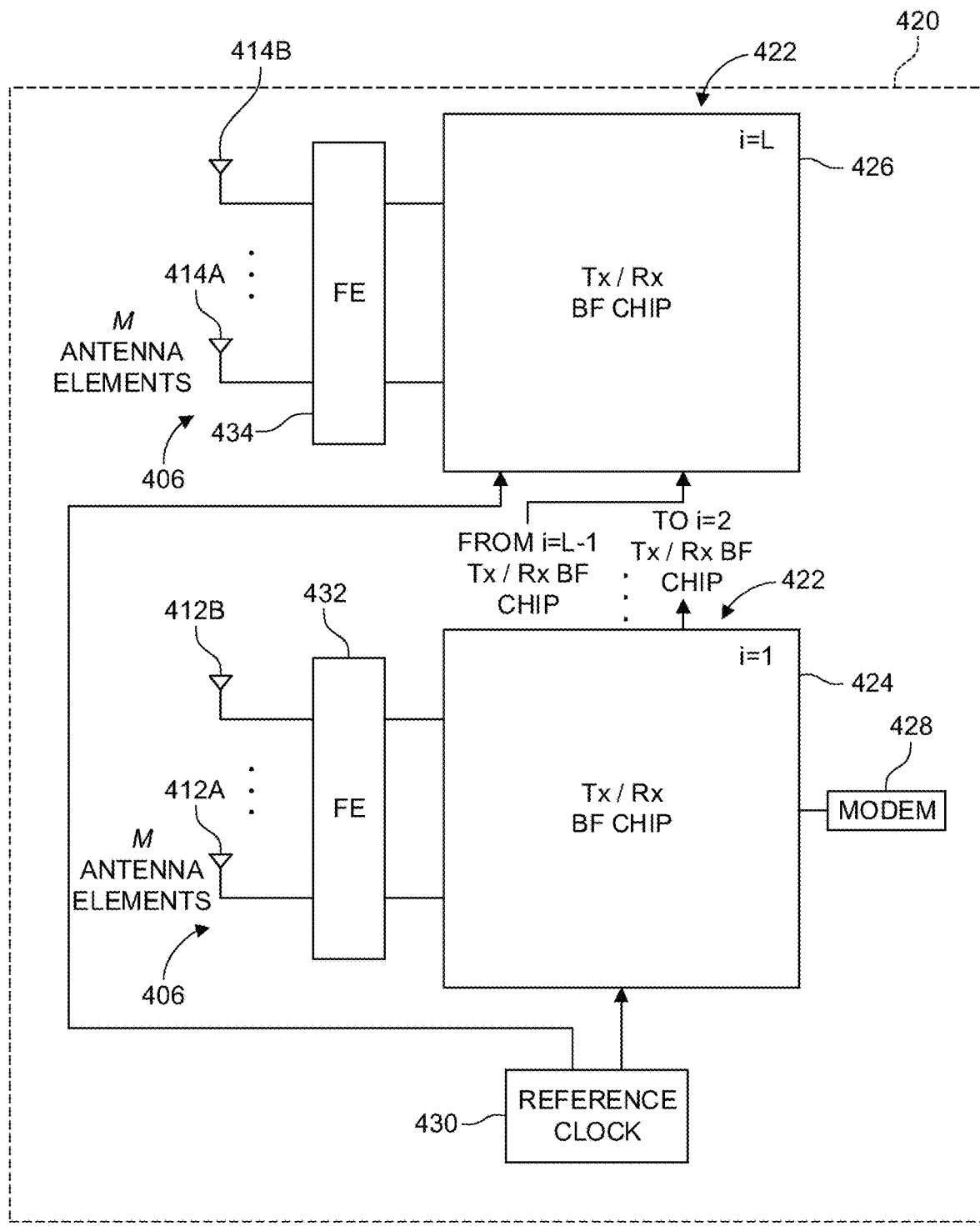
FIG. 4B is a diagram illustrating an example phased array antenna system, in accordance with some examples of the present disclosure.
Figure 4C:
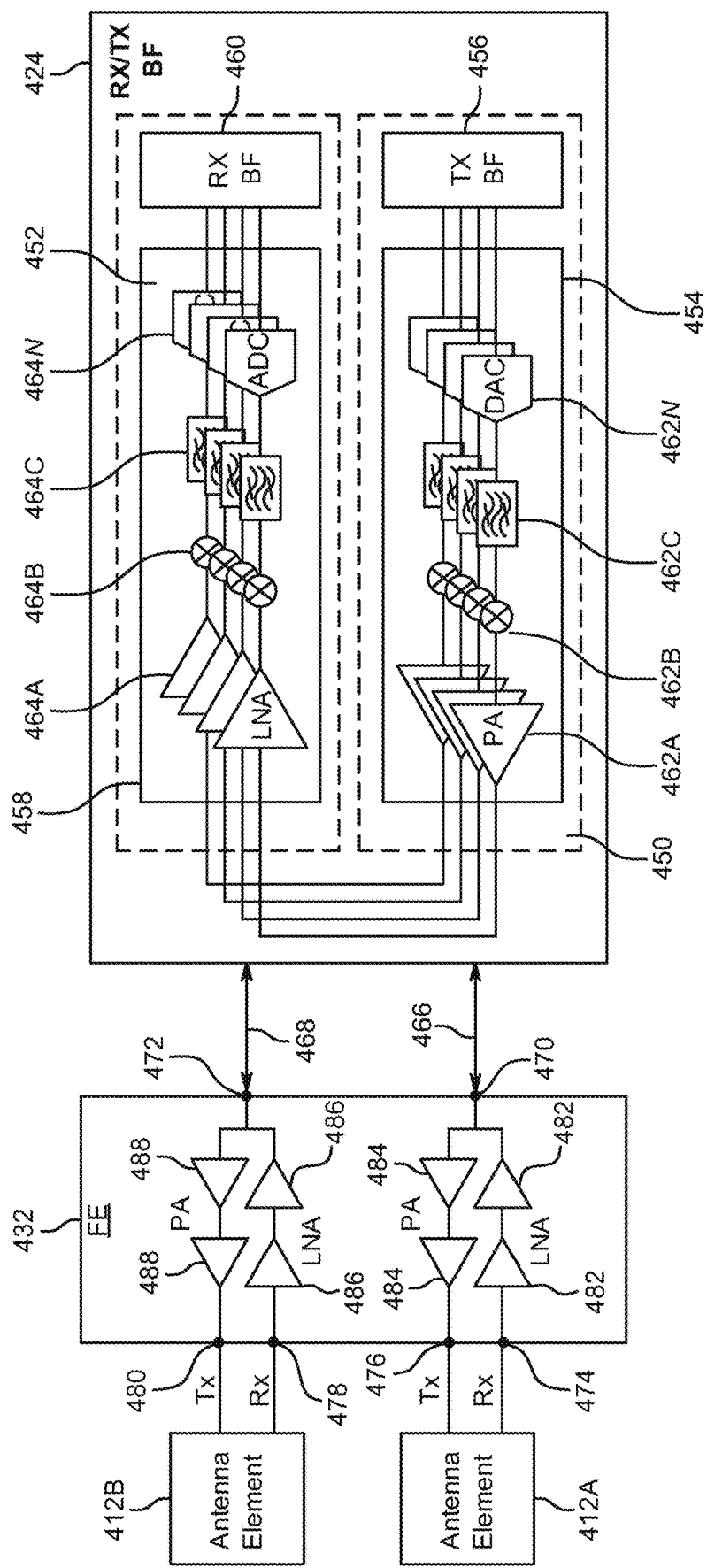
FIG. 4C is a diagram illustrating example components of a beamformer chip and a frontend that interfaces the beamformer chip with antenna elements, in accordance with some examples of the present disclosure.

In some cases, the antenna aperture 402 can be grouped into subsets of antenna elements 404A and 404B. Each subset 404A, 404B of antenna elements can include M number of antenna elements 412, 414, which can be associated with specific beamformer (BF) chips as shown in FIGS. 4B and 4C. The remaining antenna elements 410 in the antenna aperture 402 can be similarly associated with other beamformer chips (not shown).

FIG. 4B is a diagram illustrating an example phased array antenna system 420, in accordance with some examples. The phased array antenna system 420 can include an antenna lattice 406 including antenna elements 412, 414, and a beamformer lattice 422, which in this example includes beamformer (BF) chips 424, 426, for receiving signals from a modem 428 in the transmit (Tx) direction and sending signals to the modem 428 in the receive (Rx) direction.

The BF chips 424, 426 can include analog, digital, or hybrid beamformer chips. In some examples, the phased array antenna system 420 can implement analog, digital, or hybrid beamforming (e.g., implementing combined aspects of analog and digital beamforming).

The antenna lattice 406 can be configured to transmit or receive a beam of radio frequency signals having a radiation pattern from or to the antenna aperture 402. The BF chips 424, 426 in the beamformer lattice 422 can include an L number of BF chips. For example, BF chip 424 can include a BF chip i (i=1, where i=1 to L), and so forth, and BF chip 426 can include the Lth BF chip (i=L) of the BF chips in the beamformer lattice 422. Each BF chip of the beamformer lattice 422 electrically couples with a group of respective M number of antenna elements. In the illustrated example, BF chip 424 electrically couples with M antenna elements 412 and BF chip 426 electrically couples with M antenna elements 414.

In the illustrated example, the BF chips in the beamformer lattice 422 are electrically coupled to each other in a daisy chain arrangement. However, other types of beamformers (e.g., digital, analog, hybrid), beamforming techniques, configurations, coupling arrangements, etc., are within the scope of the present disclosure. For example, in some implementations, aspects of the disclosure can be implemented using beamformers having a different arrangement(s) and/or electrical coupling structure(s) such as, for example and without limitation, a multiplex feed network or a hierarchical network or H-network.

Each BF chip of the beamformer lattice 422 can include an integrated circuit (IC) chip or an IC chip package including a plurality of pins. In some cases, a first subset of the plurality of pins can be configured to communicate signals with a respective, electrically coupled BF chip(s) (if in a daisy chain configuration), and/or modem 428 in the case of BF chip 424. A second subset of the plurality of pins can be configured to transmit/receive signals with M antenna elements, and a third subset of the plurality of pins can be configured to receive a signal from a reference clock 430. The BF chips in the beamformer lattice 422 may also be referred to as transmit/receive (Tx/Rx) BF chips, Tx/Rx chips, transceivers, BF transceivers, and/or the like. As described above, the BF chips may be configured for Rx communication, Tx communication, or both.

In some cases, the BF chips 424, 426 in the beamformer lattice 422 can include amplifiers, phase shifters, mixers, filters, up samplers, switches, down samplers, VGAs, and/or other electrical components. In the receiving direction (Rx), a beamformer function can include delaying signals arriving from each antenna element so the signals arrive to a combining network at the same time. In the transmitting direction (Tx), the beamformer function can include delaying the signal sent to each antenna element such that the signals arrive at the target location at the same time (or substantially the same time). This delay can be accomplished by using "true time delay" or a phase shift at a specific frequency. In some examples, each of the BF chips 424, 426 can be configured to operate in half duplex mode, where the BF chips 424, 426 switch between receive and transmit modes as opposed to full duplex mode where RF signals/waveforms can be received and transmitted simultaneously. In other examples, each of the BF chips 424, 426 can be configured to operate in full duplex mode, where RF signals/waveforms can be received and transmitted simultaneously.

The phased array antenna system 420 can include frontend (FE) components 432, 434 that interface with the BF chips 424, 426 and the antenna elements 412, 414. For example, the FE 432 can communicatively couple the BF chip 424 with M antenna elements 412, and the FE 434 can communicatively couple the BF chip 426 with M antenna elements 414. In some examples, the FEs 432, 434 can include RF or millimeter wave (mmWave) frontend integrated circuits, modules, devices, and/or any other type of frontend package and/or component(s). In some cases, the FEs 432, 434 can include multiple-input, multiple-output (MIMO) FEs interfacing with multiple antenna elements and one or more BF chips.

The FEs 432, 434 can include various components, such as RF ports, BF ports, amplifiers (e.g., PAs, LNAs, VGAs, etc.), and the like. In some examples, in Rx mode, the FEs 432, 434 can provide a gain to RF contents of each Rx input, and low noise power to suppress the signal-to-noise ratio impacts of noise contributors downstream in the Rx chain/ path. Moreover, in Tx mode, the FEs 432, 434 can provide gain to each Tx path and drive RF power into a corresponding antenna element.

FIG. 4C is a diagram illustrating example components of a BF chip 424 and a FE 432 that interfaces the BF chip 424 with antenna elements 412A, 412B. In this example, the BF chip 424 can include a transmit section 450 and a receive section 452, and the FE 432 can include RF ports 470, 472 for RF inputs/outputs to and from the BF chip 424, Rx port 474 for receive signals and Tx port 476 for transmit signals to and from antenna element 412A, and Rx port 478 for receive signals and Tx port 480 for transmit signals to and from antenna element 412B.

The transmit section 450 can include a transmit beamformer (Tx BF) 456 and one or more RF sections 454. The Tx BF 456 can include a number of components (e.g., digital and/or analog) such as, for example and without limitation, a VGA, a time delay filter, a filter, a gain control, one or more phase shifters, one or more up samplers, one or more IQ gain and phase compensators, and the like. Each RF section 454 can also include a number of components (e.g., digital and/or analog). In this example, each RF section 454 includes a power amplifier (PA) 462A, a mixer 462B, a filter 462C such as a low pass filter, and a digital-to-analog converter (DAC) 462N. The one or more RF sections 454 can be configured to ready the time delay and phase encoded digital signals for transmission. In some examples, the one or more RF sections 454 can include an RF section 454 for each signal path 466, 468 to each antenna element 412A, 412B.

The receive section 452 can include a receive beamformer (Rx BF) 460 and one or more RF sections 458. The Rx BF 460 can include a number of components such as, for example and without limitation, a VGA, a time delay filter, a filter, an adder, one or more phase shifters, one or more down samplers, one or more filters, one or more IQ compensators, one or more direct current offset compensators (DCOCs), and the like. Each RF section 458 can also include a number of components. In this example, each RF section 458 includes a low noise amplifier (LNA) 464A, a mixer 464B, a filter 464C such as a low pass filter, and an analog-to-digital converter (ADC) 464N. In some examples, the one or more RF sections 458 can include an RF section 458 for each signal path 466, 468 to each antenna element 412A, 412B.

The FE 432 can include one or more components 482 for processing Rx signals from the antenna element 412A and one or more components 484 for processing Tx signals to the antenna element 412A. The FE 432 can also include one or more components 486 for processing Rx signals from the antenna element 412B and one or more components 488 for processing Tx signals to the antenna element 412B. In FIG. 4C, the components 482 and 486 include LNAs to amplify respective signals from the antenna elements 412A, 412B without significantly degrading the signal-to-noise ratio of the signals, and the components 484 and 488 include PAs to amplify signals from the transmit section 456 to the antenna elements 412A, 412B. In some examples, the FE 432 can include other components such as, for example, VGAs and/or phase shifters (e.g., for Rx and/or Tx).

In some cases, the FE 432 can be communicatively coupled to one or more 90-degree hybrid couplers (not shown), which can be communicatively coupled to the antenna elements 412A, 412B. In some examples, a 90-degree hybrid coupler can be used for power splitting in the Rx direction and power combining in the Tx direction and/or to interface the FE 432 with a circularly polarized antenna element. However, other directional coupler mechanisms are within the scope of the present disclosure.

The BF chip 424 and FE 432 can process data signals, streams, or beams for transmission by the antenna elements 412A, 412B, and receive data signals, streams, or beams from antenna elements 412A, 412B. The BF chip 424 can also recover/reconstitute the original data signal in a signal received from antenna elements 412A, 412B and FE 432. Moreover, the BF chip 424 can strengthen signals in desired directions and suppress signals and noise in undesired directions.

For example, in transmit mode (e.g., the transmit direction), the one or more RF sections 454 of the transmit section 450 can process signals from the Tx BF 456 and output corresponding signals amplified by the PA 462A. Signals to the antenna element 412A can be routed through signal path 466 to RF port 470 of the FE 432, and signals to the antenna element 412B can be routed through signal path 468 to RF port 472 of the FE 432. The FE 432 can process an RF signal received from signal path 466 and output an amplified RF signal through Tx port 476. Antenna element 412A can receive the amplified RF signal and radiate the amplified RF signal. Similarly, the FE 432 can process an RF signal received from signal path 468 and output an amplified RF signal through Tx port 480. Antenna element 412B can receive the amplified RF signal and radiate the amplified RF signal.

In receive mode (e.g., the receive direction), FE 432 can receive RF signals from antenna elements 412A, 412B and process the RF signals using components 482 and 486. The FE 432 can receive RF signals from antenna element 412A via Rx port 474, and RF signals from antenna element 412B through Rx port 478. The components 482 and 486 can amplify respective RF signals from the antenna elements 412A, 412B without significantly degrading the signal-to-noise ratio of the RF signals. The components 482 can output RF signals from the antenna element 412A, which can be routed from RF port 470 of the FE 432 through the signal path 466 to the receive section 452 of the BF chip 424. Similarly, the components 486 can output RF signals from the antenna element 412B, which can be routed from RF port 472 of the FE 432 through the signal path 468 to the receive section 452 of the BF chip 424.

The one or more RF sections 458 of the receive section 452 of the BF chip 424 can process the received RF signals and output the processed signal to the Rx BF 460. In some example, the processed signal can include a signal amplified by an LNA 464A of RF section 458. The Rx BF 460 can receive the signal and output a beamformed signal to a modem (e.g., modem 428).

In some examples, the transmit section 450 and the receive section 452 can support a same number and/or set of antenna elements. In other examples, the transmit section 450 and the receive section 452 can support different numbers and/or sets of antenna elements. Moreover, while FIG. 4C illustrates a single FE interfacing with the BF chip 424, it should be noted that a BF chip can interface with multiple FEs. The configuration of a single FE interfacing with a BF chip in FIG. 4C is merely an illustrative example provided for explanation purposes. Also, while the FE 432 is shown in FIG. 4C with 2 RF inputs (e.g., RF ports 474 and 478) and 2 RF outputs (e.g., RF ports 476 and 480) supporting 2 antenna elements (e.g., antenna elements 412A and 412B), it should be noted that, in other examples, the FE 432 can include more or less RF inputs/outputs and can support more or less antenna elements than shown in FIG. 4C. For example, in some cases, the FE 432 can include 4 RF inputs and 4 RF outputs and can support more than 2 antenna elements.

While the BF chip 424 and the FE 432 are shown to include certain elements and components, one of ordinary skill will appreciate that the BF chip 424 and the FE 432 can include more or fewer elements and components than those shown in FIG. 4C. For example, in some cases, the BF chip 424 and/or the FE 432 can be coupled to, reside on, and/or implemented by, a printed circuit board (PCB) of the phased array antenna system and/or any number of discrete parts on a PCB. The elements and components of the BF chip 424 and the FE 432 shown in FIG. 4C are merely illustrative examples provided for explanation purposes. Moreover, the example phased array antenna system 420 in FIG. 4B is merely an example implementation provided for explanation purposes. One of skill in the art will recognize that, in other implementations, the phased array antenna system 420 can include more or less of the same and/or different components than those shown in FIG. 4B. For example, in other implementations, the phased array antenna system 420 can implement other beamformers (e.g., analog, digital, hybrid), a different number and/or arrangement of beamformers and/or FEs, and/or any other type and/or configuration of beamformers and/or FEs.

Figure 5:
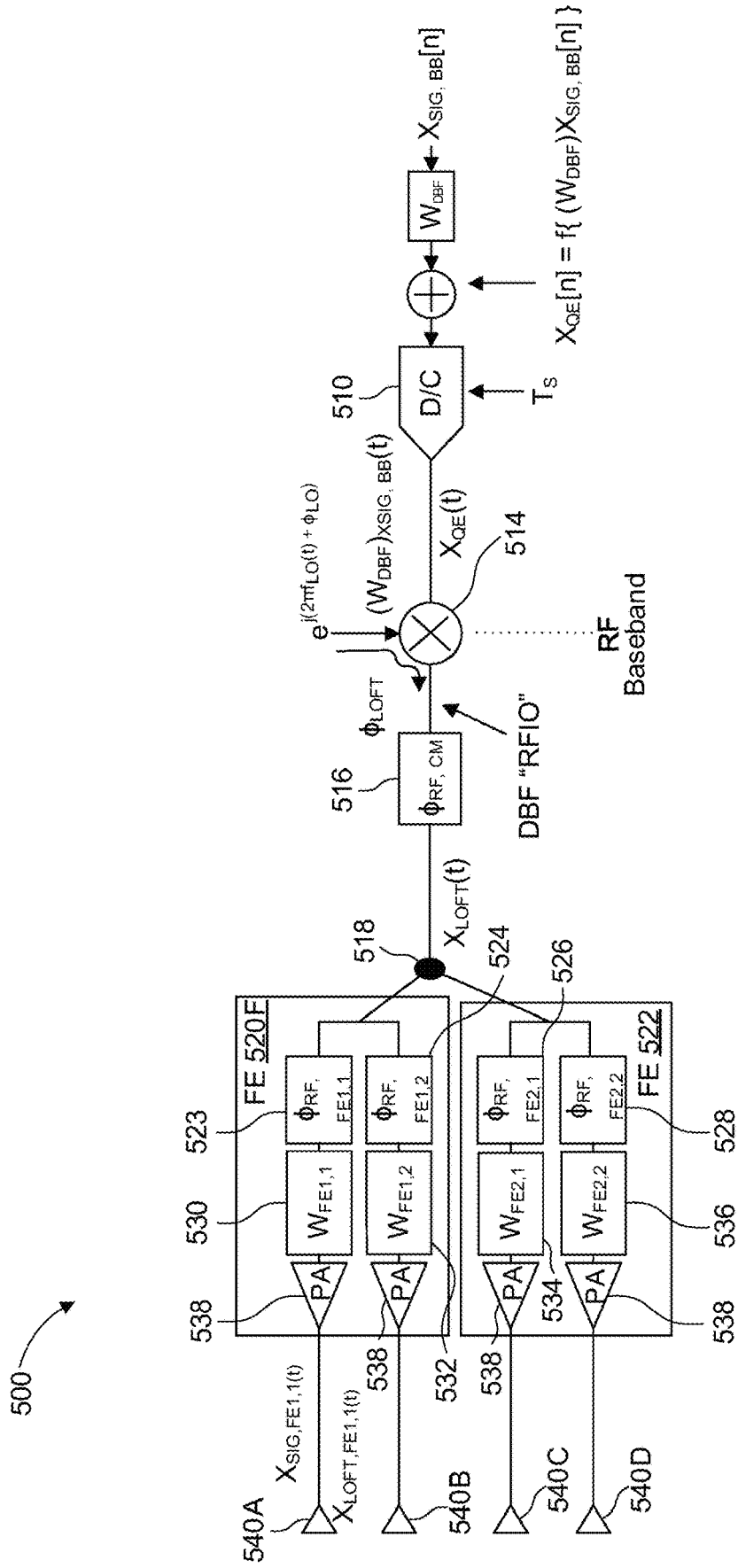
FIG. 5 is a diagram illustrating an example hybrid beamforming signal and local oscillator feedthrough path model, in accordance with some examples of the present disclosure.

FIG. 5 is a diagram illustrating an example hybrid beamforming signal and LOFT path model 500. In this example, the model 500 corresponds to a Tx operation. However, the concepts and techniques described herein can also apply to Rx operations, as further described herein.

The example architecture in FIG. 5 includes a "hybrid-4" architecture with 4:1 analog beamforming plus digital beamforming. The analog beamforming can done by combining FEs 520, 522, with each FE performing 2:1 analog beamforming. The FEs 520, 522 can be combined by a splitter/combiner element 518, such as a Wilkinson splitter/combiner. In other examples, the model 500 and the techniques described herein can be implemented in a hybrid-N beamforming architecture, with one or more distributions of analog beamforming between FEs (e.g., FEs 520, 522) and the splitter/combiner element 518.

In some examples, the common-mode phase can be varied between analog/RF beamforming groups. For example, the common-mode phase can be varied between analog/RF beamforming groups by randomizing the phase of the inverse offset weights across digital beamforming paths. By adequately varying the common-mode phase between analog/RF beamforming groupings, the coupling victim-aggressor phase relationship can also be varied/randomized between analog/RF beamforming groupings, effectively spreading the previously-mentioned large sidelobe power across all pointing directions and mitigating the Rx/Tx interference concerns. Such approaches can effectively mitigate RF/analog beamforming coupling impacts without placing requirements on calibration weight offsets, which can be applied by the analog/RF beamforming weights or a combination of analog/RF beamforming weights and digital beamforming weights.

In some examples, each Tx digital beamforming path can have a digital-to-analog converter (DAC) and each Rx digital beamforming path can have an analog-to-digital converter (ADC). On the digital side of a DAC or ADC, a defined bit width can set the number of quantization levels of the converter (e.g., converter 510), and the quantization noise power added by the converter. For example, a quantization error (QE) can appear like noise (e.g., can be similar to and/or have similar effects as noise) if the converted signal has certain characteristics such as being non-periodic. The quantization error is a function of the input signal into the converter 510. Therefore, across a Tx hybrid beamforming phased array antenna, if the digital input to each DAC is the same across digital beamforming paths, the quantization error produced by each DAC will also be the same. The quantitation error can then see the same beamforming weighting as the signal, and can be beamformed in the same direction as the signal with the full array gain.

As previously explained, in some cases, the in-band and out-of-band "noise" levels of the transmitted signal may be dominated by the converter (e.g., DAC or ADC) quantitation noise power. However, if the beamforming weighting of the signal pre-converter is adequately varied from path to path, the quantization error between paths can be de-correlated. Therefore, even if each analog/RF beamforming sub-array beamforms its respective quantization error in the signal steering angle direction, it may not sum completely "in-voltage" over-the-air with the beamformed quantization error from other sub-arrays. If the quantization error between beamforming paths is de-correlated, summing between sub-arrays may be "in-power". Any deviation for pure voltage summing (e.g., as the beamformed signal sees) can suppress the over-the-air in-band and out-of-band noise contribution by the converter quantization, thus relaxing converter performance parameters and/or constraints such as, for example, number of bits, over-sampling rate, etc.

Frequency translation can be performed between analog/RF beamforming and the DAC/ADC of the digital beamformer path. In some cases, for Tx operations, if direct-conversion is used, local-oscillator feed-through (LOFT) can be generated by an imbalance at the mixing stage. The LOFT can be subsequently beamformed in the same direction as the signal within the corresponding analog/RF beamforming sub-array. However, the antenna gain of the LOFT (and the direction of the gain) can depend on the relative LOFT weighting (e.g., phasing) between the RF/analog beamforming sub-arrays. In some cases, controlling and/or determining the relative phasing of the LOFT between sub-arrays, especially after performing "LOFT calibration" (e.g., where a possible random mixing imbalance is corrected, with possibly random error), can be difficult.

If the LOFT phasing between sub-arrays has some deterministic/periodic/repeated structure, the LOFT may see a significant antenna gain at some direction with significant angle-offset from the signal steering direction (and variation in such from one antenna to the next). In some cases, the resulting "LOFT beam" can interfere with other users/operators (e.g., much like sidelobes of the signal beam). If the digital beamforming phasing of the signal is randomized from path to path as described herein (e.g., for RF/analog beamforming coupling mitigation), with the inverse weighting applied in the RF/analog beamforming weights, the LOFT may only see the RF/analog beamforming weights, which have random common-mode phase variation between sub-arrays. For an "N-Hybrid" phased array antenna with M antenna elements, where N<<M, the peak gain of the resulting LOFT antenna gain pattern can be predictable and independent of (or largely independent of) the intrinsic relative LOFT phasing. However, this predicable peak gain value can allow the LOFT dBc performance of a direct conversion path (e.g., the total conducted LOFT power) to be specified to satisfy interference requirements, objectives, and/or parameters, which in some cases may be based on Effective Isotopically Radiated Power (EIRP). The "random-phasing" antenna gain pattern can have other useful properties for scaling up N and/or scaling up M/aperture size.

In some examples, the hybrid beamforming technologies disclosed herein can mitigate the impacts of output-to-input RF-coupling in a beamformer FE (e.g., FE 520, 522), such as the creation of a "grating-lobe" in the Tx antenna pattern that exceeds a regulatory mask for effective isotopically radiated power (EIRP) in directions away from the main beam. The phase relationship between the victim and aggressor in the FE coupling (for a given path) can be determined by the fixed loop-gain parameters of both FE paths ("open-loop" gain, output-to-input coupling) and the programmable settings of the phase-shifters of both FE paths. The victim-aggressor phase-relationship can be determined by the "common-mode" phase between the two paths. This is in contrast to analog beamforming (e.g., within an FE), which is only dependent on the "differential-mode" phase between the two paths. The same holds for a FE with more than 2 paths. Therefore, within an analog beamforming group of FEs (with a common DBF path), the "common-mode" phase can be adjusted without an impact on beamforming except for the added "error".

A transmit (or receive) signal in the hybrid-beamforming architecture can see the phase-shifter in the FE and a phase-shifter in the digital beamformer (DBF). Therefore, the actual beamforming weight can be the product of the weights applied by both phase-shifters.

The coupling victim-aggressor phase relationship can be determined by the common-mode phase applied via the FE's phase-shifters. Thus, the aggressor-victim phase relationship can be uniformly-spread/randomized across analog beamforming antenna groups (e.g., since each group can have a dedicated/independently-programmable DBF weight).

In a direct conversion transmitter, non-idealities and imbalance in the mixing stage (e.g., DC imbalance between differential inputs, direct coupling between LO and output port) can result in local-oscillator feed-through (LOFT). Because there is modulation around the LOFT tone, it generally is not removed by post-mixer filtering, and is accordingly transmitted with the signal. In a phased array antenna, the relative phasing of the LOFT across antenna elements (e.g., antenna elements 540) can result in various array factors and antenna radiation patterns. In some cases, the resulting "LOFT beams" may or may not point in the same direction as the signal beam.

In an example hybrid-beamforming architecture, the signal is given complex weights using the RF phase-shifters in the RF beamforming FEs, as well as the digital baseband phase shifters in the digital beamformer (DBF) (e.g., the total signal beamforming weight can be the product of the RF and baseband weights). Each path of the DBF is also a direct conversion transceiver frontend. Considering the full Tx signal path, LOFT is generated during the transition from analog baseband to RF within the DBF (e.g., the analog/RF domain portion). Accordingly, LOFT may not see the DBF digital phase shifter, but may see the frontend RF phase shifter. Therefore, the complex weights that are applied to LOFT versus the signal can be varied on a per DBF-path basis. For example, the DBF baseband phase shifters can be programmed to apply a weight set "X". To beam form the signal in the desired direction, weight set "Y" may be used and/or needed. Accordingly, the weights to apply to the frontend RF phase shifters can be "Y/X".

The example architecture in FIG. 5 includes a "hybrid-4" architecture (e.g., 4:1 analog beamforming plus digital beamforming). The analog beamforming can done by combining FEs 520, 522, with each performing 2:1 analog beamforming, via a Wilkinson splitter/combiner 518. Therefore, a weight applied at baseband is common to groups of 4 antennas (e.g., antenna elements 540) (e.g., for signal). For groups of 4 antennas, the LOFT may be beamformed in the direction corresponding to weight set "Y" (since "X" of "Y/X" FE IC weights is common between the 4 antennas). However, the array factor for a size 4 array is low, so the LOFT array factor (at the panel level) is in large driven by weight set "X".

Weight set "X" could be set to anything. However, in some examples herein, weight set "X" can be set to a random, uniform distribution [0 to 360] degrees. The phasing of "Y/X" can also become a random uniform distribution (even though Y is deterministic).

Using a random, uniform distribution can produce an array factor where the direction of a peak may be widely varying, but the peak level is limited to a predictable level (regardless of the weight set "Y"). In comparison, if there is some amount of structure with the "Y/X" LO phasing, array factor peaks may be considerably higher (e.g., closer to the beamforming array-factor). In some cases, the peak LOFT array factor (and corresponding antenna gain) can be advantageously limited because it in part determines the peak LOFT EIRP. For example, the antenna gain can equal the array factor plus the single-element gain, and the EIRP can equal the conducted input power into antenna plus the antenna gain. With maximum peak gain established from random LOFT phasing as described herein, the single-path LOFT rejection needed for a certain EIRP can be calculated (and the LOFT calibration procedures to reach a certain rejection). Random, uniformly distributed LOFT phasing in an example "Hybrid-N" beamforming phased array antenna with direct conversion and M antenna elements (and thus M/N DBF ports/LOFT phases), has additionally characteristics that are advantageous for design scaling.

In some examples, as the panel size is scaled up (e.g., scaled up aperture area with same element spacing), the peak LOFT gain (e.g., in dBi) may not scale with $10*\log 10(A2/A1)$, where A2/A1 is aperture area scaling ratio. In some cases, if A1 is already sufficiently large, the peak LOFT gain may not significantly increase with further aperture area/element increases. Moreover, the signal antenna gain can scale with $10*\log 10(A2/A1)$. Therefore, if conducted LOFT dBc power, per DBF path, is constant between the two design, peak LOFT EIRP dBc (referenced to signal beam) can reduce by $10*\log 10(A2/A1)$.

In some cases, if "N" is increased from N2 from N1 (e.g., more antennas mapping to single DBF path via RF/analog beamforming), peak LOFT will become more directive, with peak gain increasing $10*\log 10(N2/N1)$, but the high directivity can move closer to the signal steering direction (e.g., where interference with other users/operators may be of less or no concern), while directivity can reduce in the region where sidelobe/LOFT interference is problematic.

A Digital-to-Analog Converter (DAC) converts a digital value, encoded over B-bits, into an analog value (voltage or current). In operating on a digital signal, the DAC operates at a sampling rate ($f_s$) (e.g., the rate at which new samples are presented to the DAC and subsequently converted to corresponding analog value). The sampling rate sets the maximum useable bandwidth of the corresponding analog signal. Prior to the DAC, the digital signal may be encoded at high precision (e.g., floating point accuracy). In some cases, due to DAC design constraints, the number of bits encoding the signal can be stepped down to B. This step is called "quantization". For example, with a 6-bit quantization, a floating point number with range of [−1 and 1] may be mapped to a 6b signed integer in the range of [−32 to +31]. In some examples, if the full-scale analog range of the DAC is +/−100 mV, then a −32 input value would result in −100 mV, while +31 would map to 31/32*100 mV.

The resulting quantization error can appear noise-like (e.g., flat spectrum) if the signal has certain characteristics such as, for example, non-periodic with the DAC sampling rate, as is modulated baseband data-stream. The "quantization noise power", with respect to DAC full-scale, can be determined by the number of DAC bits B. For example, for every 1-bit increase in B, the quantization noise power can be pushed down by 6.02 dB (e.g., in linear units, a 4× reduction of noise power). As $f_s$ is increased by a factor of K, the total quantization noise power (in the discrete frequency domain) may be unchanged. In some cases, however, only 1/Kth of the total quantization noise power sits within 0 to a $f_s/(2K)$ section of discrete frequency domain. In some examples, to reduce the "in-band" quantitation noise power without increasing B, the sampling rate can be increased beyond the Nyquest rate, with post-DAC filtering removing the "out-of-band" quantization noise. This concept is called "over-sampling". Other methodologies can also be implemented to reduce the "in-band" signal to quantization noise ratio (SQNR), such as noise-shaping and sigma delta modulation. The foregoing is also applicable to Analog-to-Digital Converters (ADCs).

In some cases, in an example "hybrid-N" beamforming architecture, an M-element Tx phased array antenna can have M/N DBF paths and quadrature DACs ("IQ-DACs"). Each IQ-DAC may include multiple DACs, such as 2 DACs for example, with one converting the "I" baseband stream and the other converting the "Q" baseband stream. In some cases, these streams can be processed separately in the "analog-baseband" until quadrature up-conversion.

In a "single-beam" system, each IQ-DAC, on the digital side, can see an identical copy of the same signal, but with the option of additional complex weighting and/or processing (e.g., time-delay, magnitude scaling, DC offset adjustment, etc.) done before DAC quantization. If the complex weighting/processing is also identical between IQ-DACs, the signal going into the I DACs may be the identical across the phased array antenna, and the signal going into the Q DAC may be identical across the phased array antenna. Thus, in some cases, the same complex quantization error may be generated for every DBF path, and after subsequently seeing the RF/analog beamforming weights, can be beamformed in the signal steering direction with "full-array" gain. In this condition, if the SQNR at a single DAC output is XdB, the SNR of the beam-formed "over-the-air" signal can be no better than XdB (e.g., can be further degraded by other noise/non-linearity in the Tx signal path), as well as for "noise" in the adjacent channel (assuming "steep" channel filtering is not employed in the analog/RF path). The SNR of the transmitted signal beam can be sufficiently high to avoid limiting the data throughput of the Tx to Rx link. The transmitted "in-beam" adjacent channel noise power can be sufficiently low in order to avoid interfering with other users/operators.

If the weights/processing of the complex digital signal can be sufficiently varied across the panel, the correlation between the quantization error on different paths may be low and/or virtually zero. In the near-zero scenario, the quantization error may only be beamformed on an N-path basis (e.g., within the RF/analog beamforming sub-array with common DBF path). In some cases, between sub-arrays, the quantization error may add in power (over-the-air). Accordingly, in some cases, the signal can see a 10*log 10(M/N) dB gain in the beamformed direction that the collected quantization error/noise does not. From the Tx side, the impact of the single DAC design is reduced. For example, if M equals 1000 and N equals 4, the over-the-air SQNR "averaging" can be approximately 24 dB. If pre-DAC weighting/processing is instead identical between paths, a DAC with an additional 4 bits can be implemented. The same applies for Rx operation and the ADCs.

The described "DAC/ADC relaxation" is a beneficial property of an example digital beamforming phased array antenna. In a fully digital beamforming phased array antenna, beamforming weights as well as calibration offsets can be applied to the signal copies on the digital side of the converters, resulting in sufficient quantization error decorrelation between paths.

In FIG. 5, the FEs 520, 522 can include analog beamforming FEs. The FEs 520, 522 can be coupled to a splitter/combiner 518 that is coupled to a DBF 516. The DBF 516 can be coupled to a mixer 514, which can be coupled to a converter 510. The common mode "pm" offset for the illustrative antenna paths (e.g., the 4 antenna paths across the FEs 520, 522 to antenna elements 540A-D) with a common DBF port can be represented as $\phi_{cal,CM}$. The FEs 520, 522 can implement phase shifters 523, 524, 526, 528, analog beamforming FE weights 530, 532, 534, 536, and PAs 538.

Moreover, $\phi_{LO}$ can represent the LO phase at the mixer 514, $\phi_{RF,CM}$ can represent a phase shift along a common RF signal path (e.g., due to trace lengths), and $\phi_{RF,FE\{n\},\{m\}}$ (e.g., phase shifters 523, 524, 526, 528) can represent an FE "n" path "m" specific phase shift along an RF signal path (e.g., due to mismatch/non-idealities in the FEs).

In some examples, post LOFT calibration, phase{$x_{LOFT}$(t)} can equal (or can be assumed to equal) $\varphi_{LO}+\varphi_{LOFT}+\varphi_{RF}$, and $\varphi_{LOFT}$ can be (or can be assumed to be) approximately the same across paths/DBFs.

In some examples, signals at an antenna element (e.g., antenna elements 540A, 540B, 540C, 540D) can be calculated as illustrated in Equations 1-2 below (ignoring envelop time-delay and quantization noise):

$$x_{SIG,FE\{n\},\{m\}}(t)=[W_{FE\{n\},\{m\}}(e^{j\varphi_{RF,FE\{n\},\{m\}}})(e^{j\varphi_{RF,CM}})$$
$$(e^{j\varphi_{LO}})W_{DBF}][x_{SIG,BB}(t)e^{j2\pi f_{LO}(t)}] \quad \text{Equation (1)}$$

$$x_{LOFT,FE\{n\},\{m\}}(t)=[W_{FE\{n\},\{m\}}(e^{j\varphi_{RF,P\{n\},\{m\}}})(e^{j\varphi_{RF,CM}})$$
$$(e^{j\varphi_{LOFT}})(e^{j\varphi_{LO}})]e^{j2\pi f_{LO}(t)} \quad \text{Equation (2)}$$

In some examples, the measured calibration offsets can be as follows:

$$\varphi_{cal,FE\{n\},\{m\}}=\text{phase}\{x_{SIG,FE\{n\},\{m\}}(t)\}-\text{phase}\{(W_{FE\{n\},\{m\}})(W_{DBF})\} \quad \text{Equation (3)}$$

where the terms $(W_{FE\{n\},\{m\}})(W_{DBF})$ can correspond to the programmed weights during calibration measurement.

$$\varphi_{cal,FE\{n\},\{m\}} = \varphi_{RF,FE\{n\},\{m\}} + \varphi_{RF,CM} + \varphi_{LO} \quad \text{Equation (4)}$$

$$\varphi_{cal,CM} = \frac{\varphi_{cal,FE1,1} + \varphi_{cal,FE1,2} + \varphi_{cal,FE1,1} + \varphi_{cal,FE1,2}}{4} \quad \text{Equation (5)}$$

$$\varphi_{cal,DM,FE1,1} = \varphi_{cal,FE1,1} - \varphi_{cal,CM} \quad \text{Equation (6)}$$

$$\varphi_{cal,DM,FE1,2} = \varphi_{cal,FE1,2} - \varphi_{cal,CM} \quad \text{Equation (7)}$$

$$\varphi_{cal,DM,FE2,1} = \varphi_{cal,FE2,1} - \varphi_{cal,CM} \quad \text{Equation (8)}$$

$$\varphi_{cal,DM,FE2,2} = \varphi_{cal,FE2,2} - \varphi_{cal,CM} \quad \text{Equation (9)}$$

In some examples, $\varphi_{cal,CM}$ can be compensated by an analog beamforming FE (e.g., FE 520, 522). In some cases, variance can be high or random.

In some cases, $\varphi_{cal,DM,FE1,1}$, $\varphi_{cal,DM,FE1,2}$, $\varphi_{cal,DM,FE2,1}$, and $\varphi_{cal,DM,FE2,2}$ can be compensated via the analog beamforming FE weights 530, 532, 534, 536. Moreover, the variance here can be low.

In some examples, the desired beamforming weight $W_{BF,FE\{n\},\{m\}}$, can be calculated based on a desired signal steering angle and the $\{x,y\}$ position of the antenna (e.g., antenna element 540A, antenna element 540B, antenna element 540C, antenna element 540D) corresponding to FE "n", path "m".

In some cases, calibration offsets can be applied in the FE (e.g., FE 520, FE 522) or the DBF (e.g., DBF 516) as follows:

$$W_{FE\{n\},\{m\}} = \frac{W_{BF,FE\{n\},\{m\}}}{W_{DBF}}\left(e^{-j\varphi_{cal,DM,FE\{n\},\{m\}}}\right)\left(e^{-j\varphi_{cal,CM}}\right) \quad \text{Equation (10)}$$

In some examples, the offsets in Equation 10 (e.g., $(e^{-j\varphi_{cal,DM,FE\{n\},\{m\}}})(e^{-j\varphi_{cal,CM}})$) can be phase offsets or complex weights (e.g., phase and magnitude). In some cases, "common" calibration offsets can be applied at the DBF 516 as follows:

$$W_{FE\{n\},\{m\}} = \frac{W_{BF,FE\{n\},\{m\}}}{\tilde{W}_{DBF}}\left(e^{-j\varphi_{cal,DM,FE\{n\},\{m\}}}\right); \quad \text{Equation (11)}$$

$$W_{DBF} = \tilde{W}_{DBF}\left(e^{-j\varphi_{cal,CM}}\right)$$

In some examples, DBF scrambling can be performed as follows:

$$\varphi_{SCRAMBLE} = rand\{\text{uniform}, [0, 2\pi)\}; \quad \text{Equation (12)}$$

$$W_{DBF} = e^{j\varphi_{SCRAMBLE}}$$

$$W_{FE\{n\},\{m\}} = \frac{W_{BF,FE\{n\},\{m\}}}{W_{DBF}}\left(e^{-j\varphi_{cal,DM,FE\{n\},\{m\}}}\right)\left(e^{-j\varphi_{cal,CM}}\right) \quad \text{Equation (13)}$$

In some cases, the $W_{DBF}$ phase spread can suppress DAC QE correlation, over-the-air (e.g., the phase-shift of common baseband signal into DAC can be well distributed over 0-360 degrees across DBF paths). Moreover, the "random" $W_{DBF}$ term in $W_{FE\{n\},\{m\}}$ can mitigate FE coupling impacts. For example, the aggressor-victim phase relationship can be randomized by the term. Moreover, the term can also enforce "random-phasing" of the LOFT.

Figure 6:
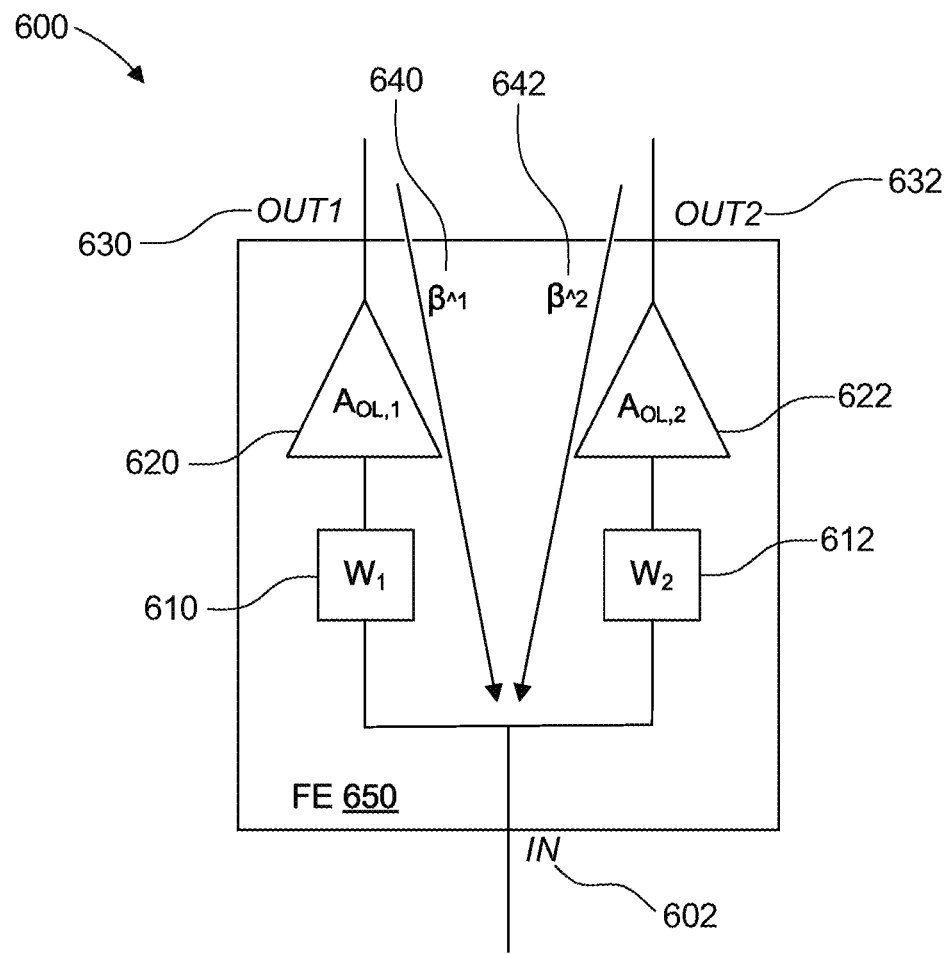
FIG. 6 is a diagram illustrating an example coupling model at an analog beamforming frontend, in accordance with some examples of the present disclosure.

FIG. 6 is a diagram illustrating an example coupling model 600 at an analog beamforming FE 650. For illustrative purposes, in this example, the coupling model 600 is shown from a Tx mode. The coupling model 600 illustrates coupling between input 602 and outputs 630, 632.

In some examples, the coupling can be calculated as follows:

$$\frac{OUT_1}{IN} = \frac{A_{OL,1}W_1}{1 - T_1 - T_2} \quad \text{Equation (14)}$$

$$\frac{OUT_2}{IN} = \frac{A_{OL,2}W_2}{1 - T_1 - T_2} \quad \text{Equation (15)}$$

Moreover, the "loop gain" (T) can be calculated as follows:

$$T_1 = A_{OL,1}W_1\beta_1 \quad \text{Equation (16)}$$

$$T_2 = A_{OL,2}W_2\beta_2 \quad \text{Equation (17)}$$

In the above examples, the complex weights 610, 612 ($W_1$, $W_2$) can be applied by a phase-shifter/quadrature vector modulator. Moreover, in some cases, a complex value can change with a beamforming steering angle.

In some cases, the open-loop gains 620, 622 ($A_{OL,1}$, $A_{OL,2}$) can be complex (e.g., can have fixed PA contributions). The feedback factors 640, 642 ($\beta_1$, $\beta_2$) can be at least partly due to output-to-input RF coupling.

Figure 7:
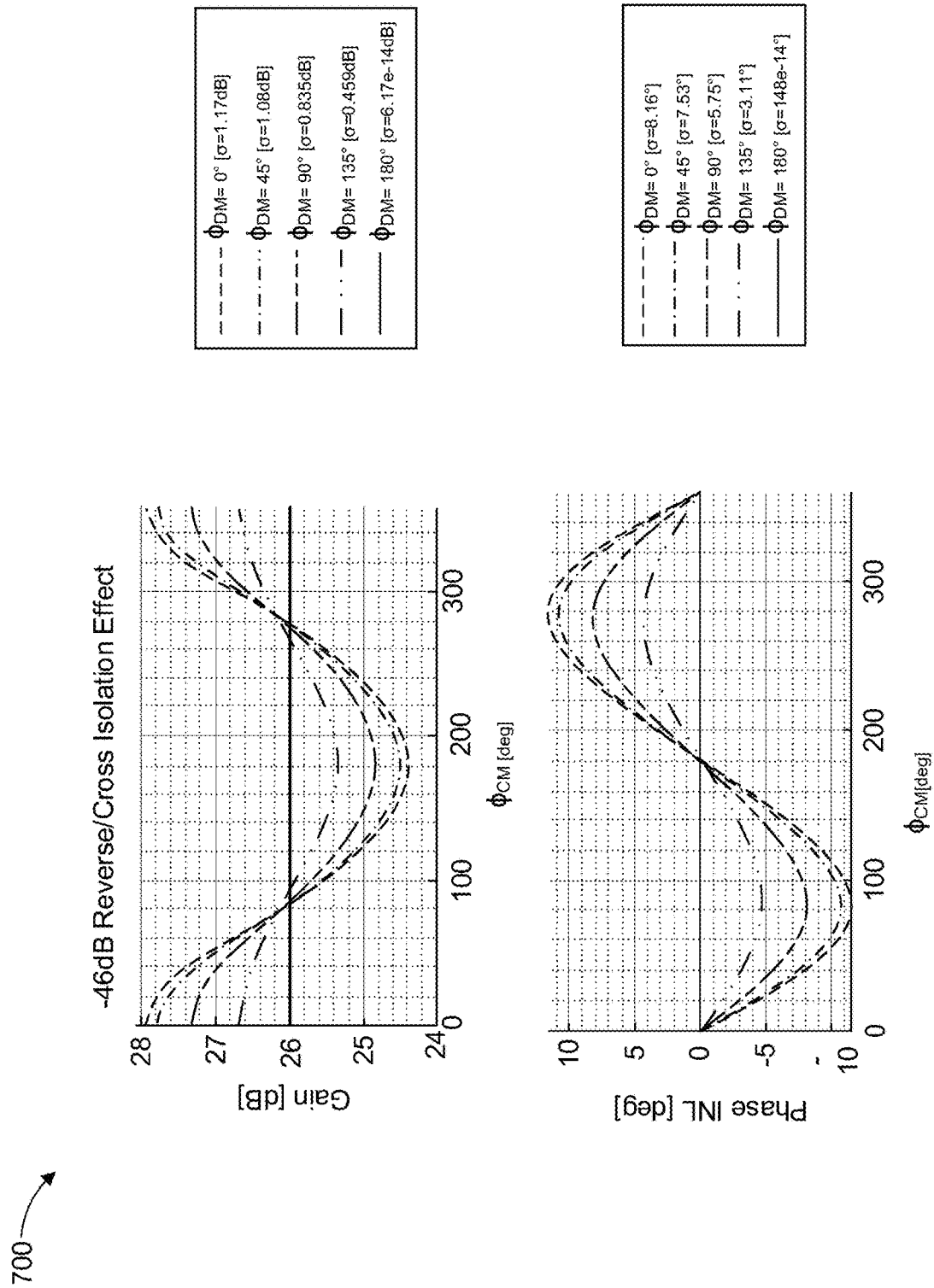
FIG. 7 illustrates an example chart showing example effects associated with a coupling model at an analog beamforming frontend, in accordance with some examples of the present disclosure.

FIG. 7 illustrates an example chart 700 showing example effects associated with a coupling model at an analog beamforming FE. An example coupling model associated with the chart 700 can be as follows:

$$A_{OL,1} = A_{OL,2} = A_{OL} \rightarrow |A_{OL}| \text{ dB} = 26 \text{ dB} \quad \text{Equation (18)}$$

$$\beta_1 = \beta_2 = \beta \rightarrow |\beta| \text{ dB} = -46 \text{ dB} \quad \text{Equation (19)}$$

$$|W_1| = |W_2| = 1 \quad \text{Equation (20)}$$

$$\varphi_1 = \text{PHASE}\{W_1\}, \quad \varphi_2 = \text{PHASE}\{W_2\} \quad \text{Equation (21)}$$

$$\varphi_{CM} = \frac{\varphi_1 + \varphi_2}{2}; \quad \varphi_1 = \varphi_{CM} + \frac{\varphi_{DM}}{2} \quad \text{Equation (22)}$$

$$\varphi_{DM} = \varphi_1 - \varphi_2; \quad \varphi_2 = \varphi_{CM} - \frac{\varphi_{DM}}{2} \quad \text{Equation (23)}$$

As shown in FIG. 7, with $\Phi_{DM}$ variation at constant $\Phi_{CM}$, there can be a same victim-aggressor phase-relationship and varied aggressor magnitude (e.g., at $\Phi_{DM}$=180°, coupling cancellation). Moreover, with $\Phi_{CM}$ variation at constant $\Phi_{DM}$, there can be a varied victim-aggressor phase-relationship and same aggressor magnitude.

Figure 8:
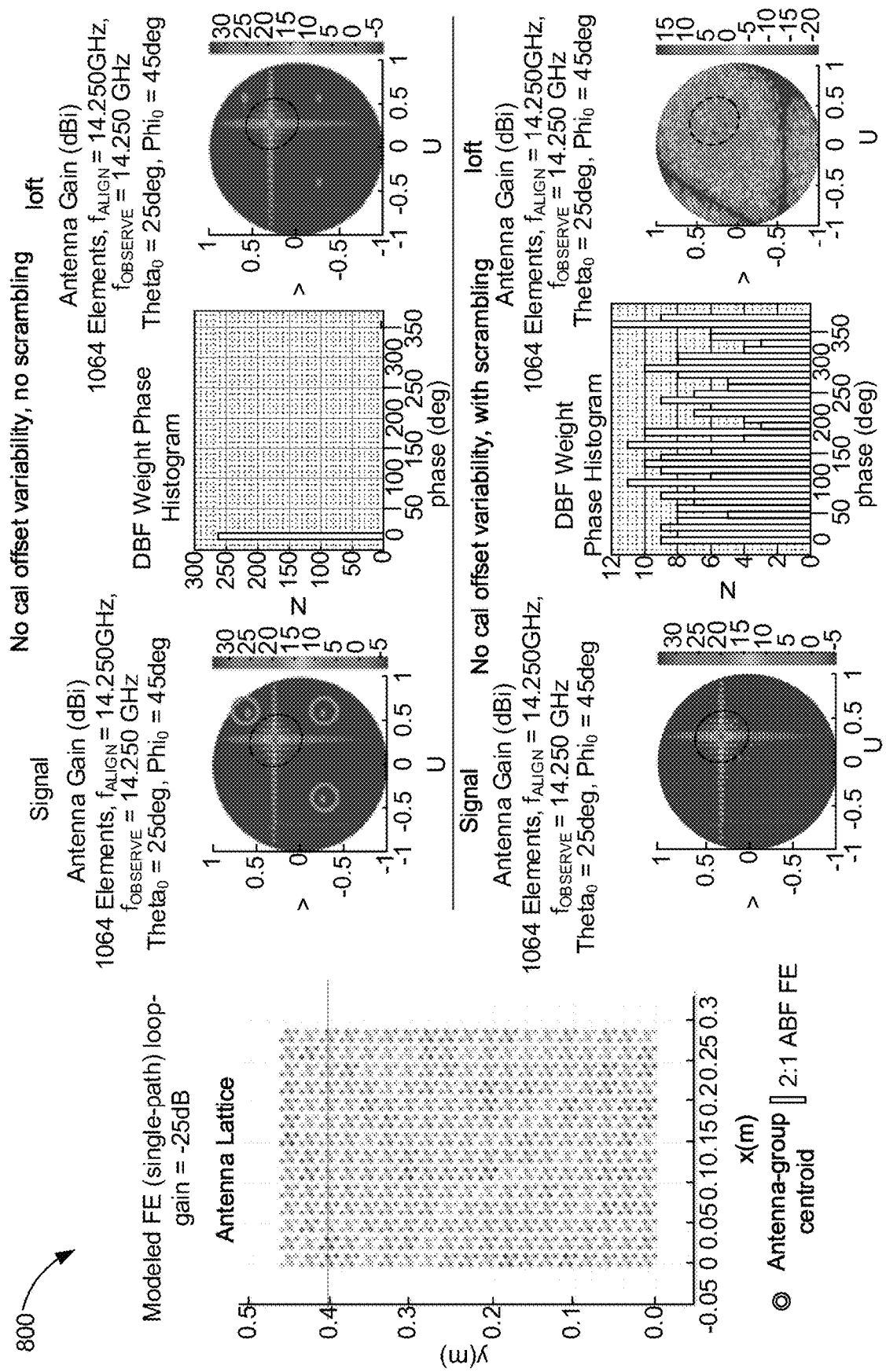
FIG. 8 illustrates an example chart showing analog beamforming frontend coupling mitigation and local oscillator feedthrough gain patterns with and without a digital beamforming scrambling process, in accordance with some examples of the present disclosure.

FIG. 8 illustrates an example chart 800 showing analog beamforming FE coupling mitigation and LOFT gain patterns with and without DBF scrambling. In some examples, the DBF scrambling can be according to Equations 12-13 described above.

Figure 9A:
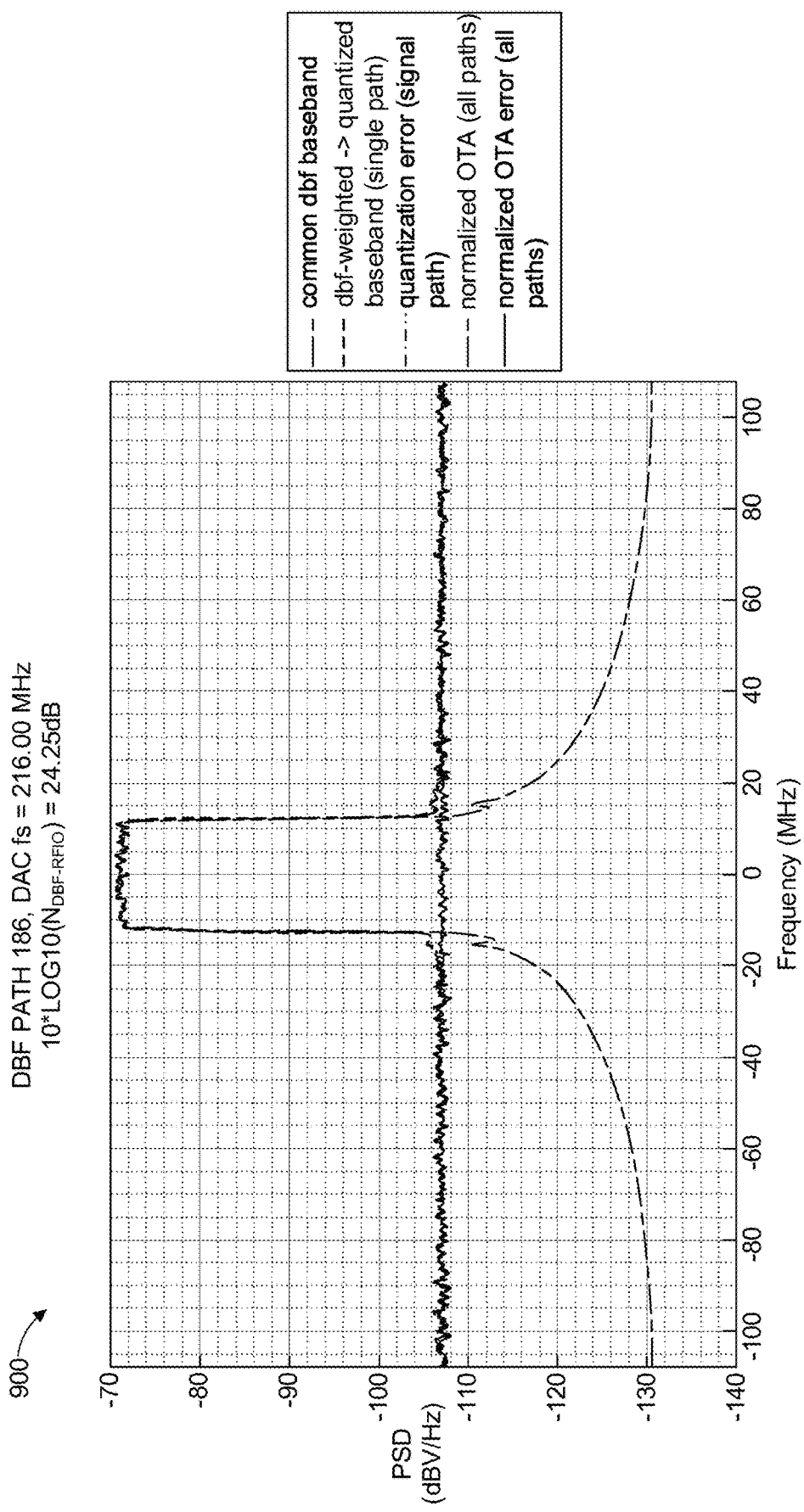
FIGS. 9A through 9D illustrate example charts showing digital-to-analog converter (DAC) quantization error averaging associated with a digital beamforming scrambling process, in accordance with some examples of the present disclosure.
Figure 9B:
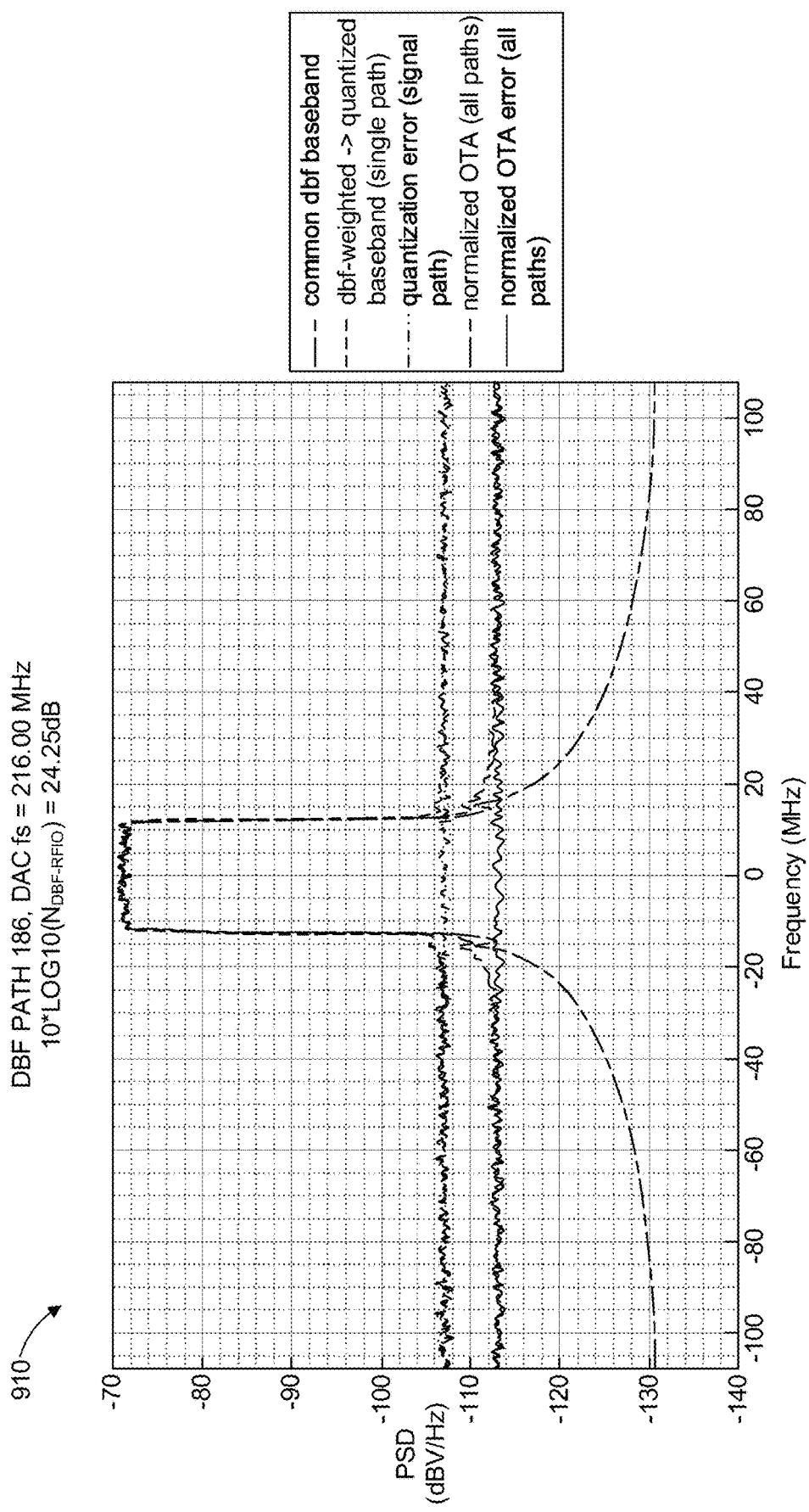
Figure 9C:
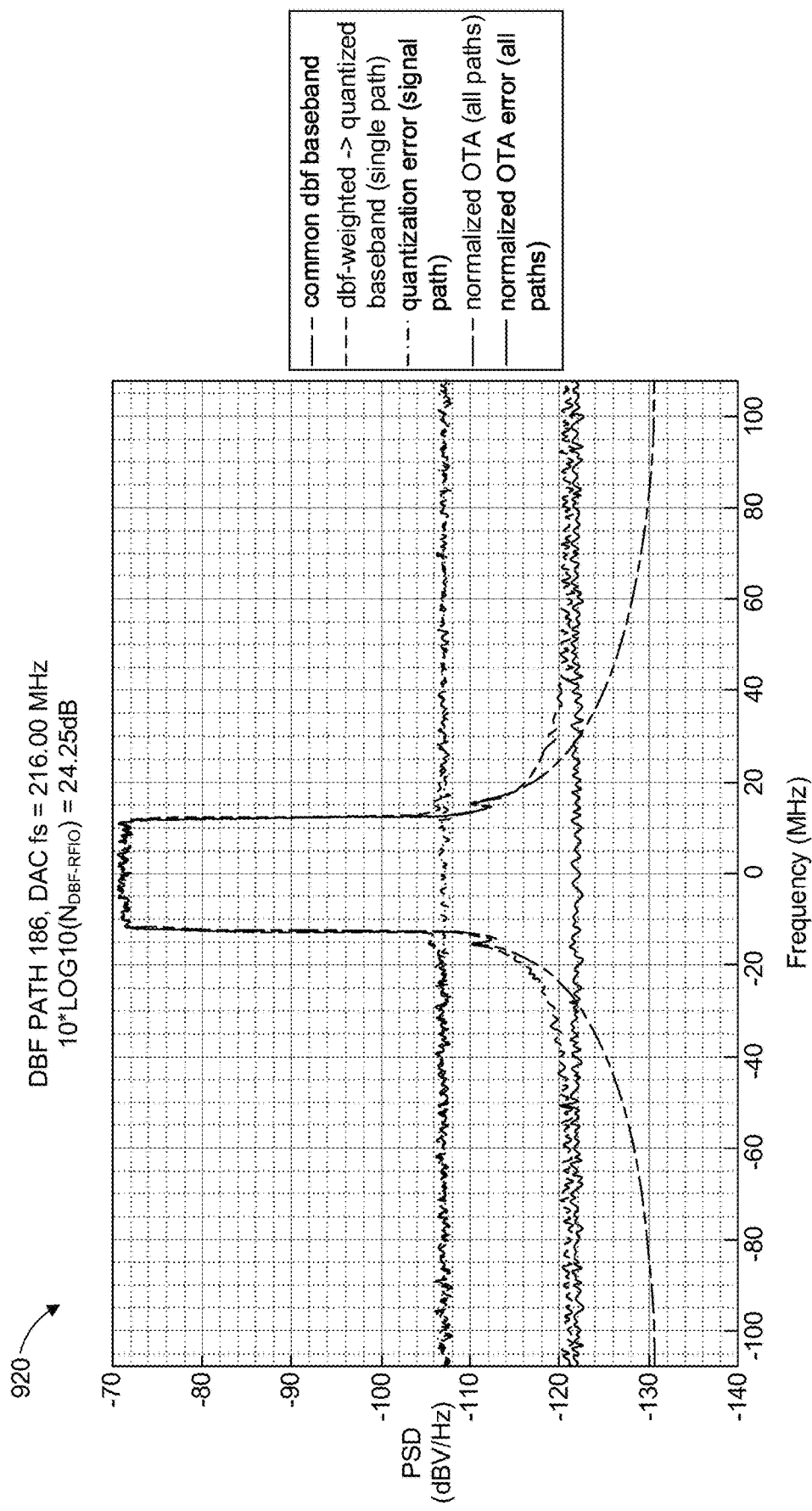
Figure 9D:
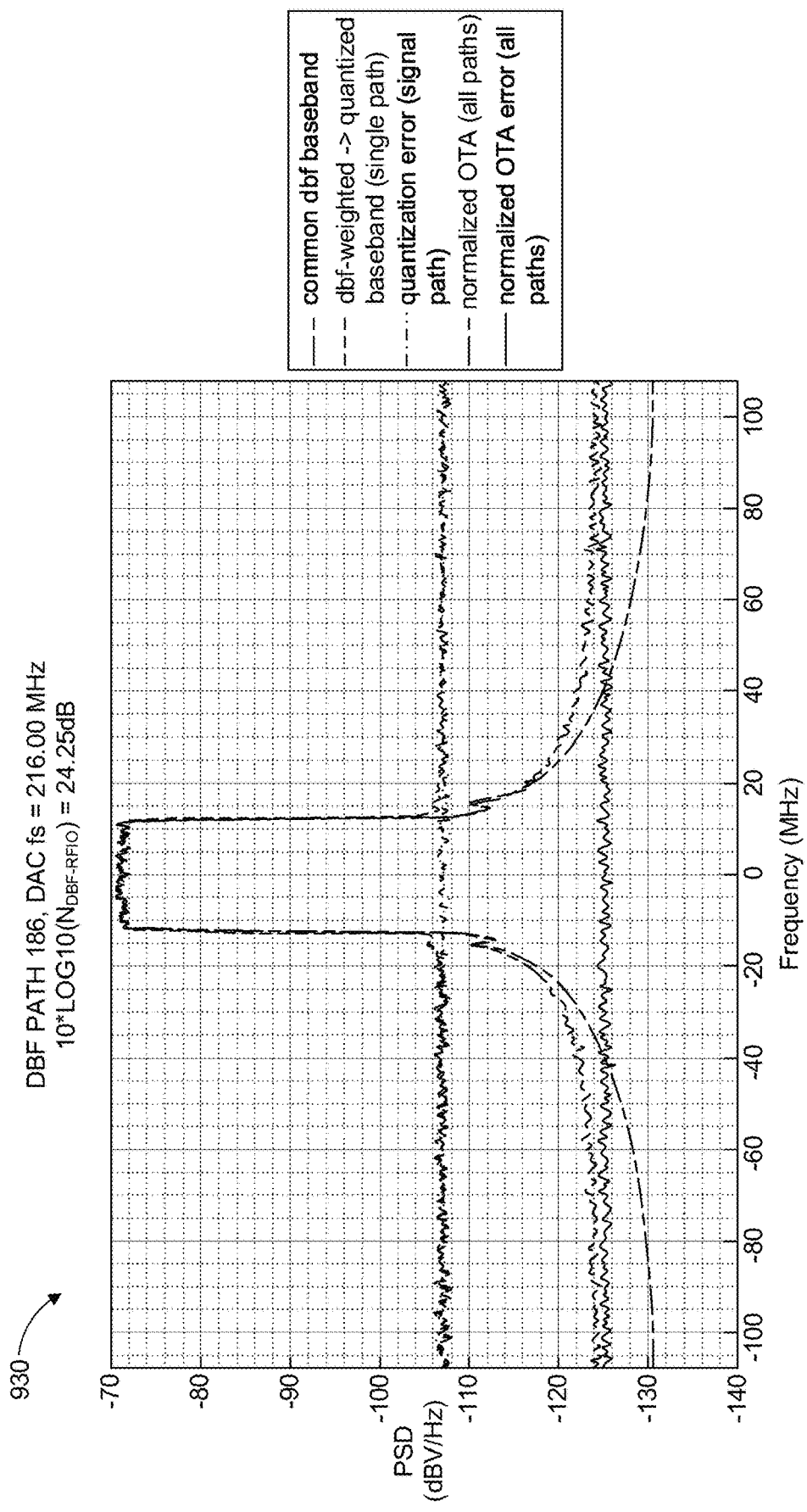

FIGS. 9A and 9D illustrate example charts 900, 910, 920, 930 showing DAC quantization error averaging associated with a DBF scrambling process. In some examples, the DBF scrambling can be according to Equations 12-13 described above. Moreover, the DAC quantization error averaging can be based on an ideal 6b quantizer and an 8× oversampling ratio (OSR).

As shown in chart 900 in FIG. 9A, the DBF signal's phase/gain are aligned at input to DAC (e.g., "no scrambling"). In chart 910 in FIG. 9B, complex weight phase "scrambling" is disabled. Moreover, there is a 3 dB random "pre-DAC" magnitude back-off scaling to compensate for inverse gain variation post-DAC.

In chart 920 in FIG. 9C, complex weight phase "scrambling" is enabled. Moreover, DBF weight magnitude can be constant and no pre-DAC magnitude scaling variation is applied. In chart 930 in FIG. 9D, complex weight phase "scrambling" is enabled, and there is a 3 dB random "pre-DAC" magnitude back-off scaling to compensate for inverse gain variation post-DAC.

Figure 10:
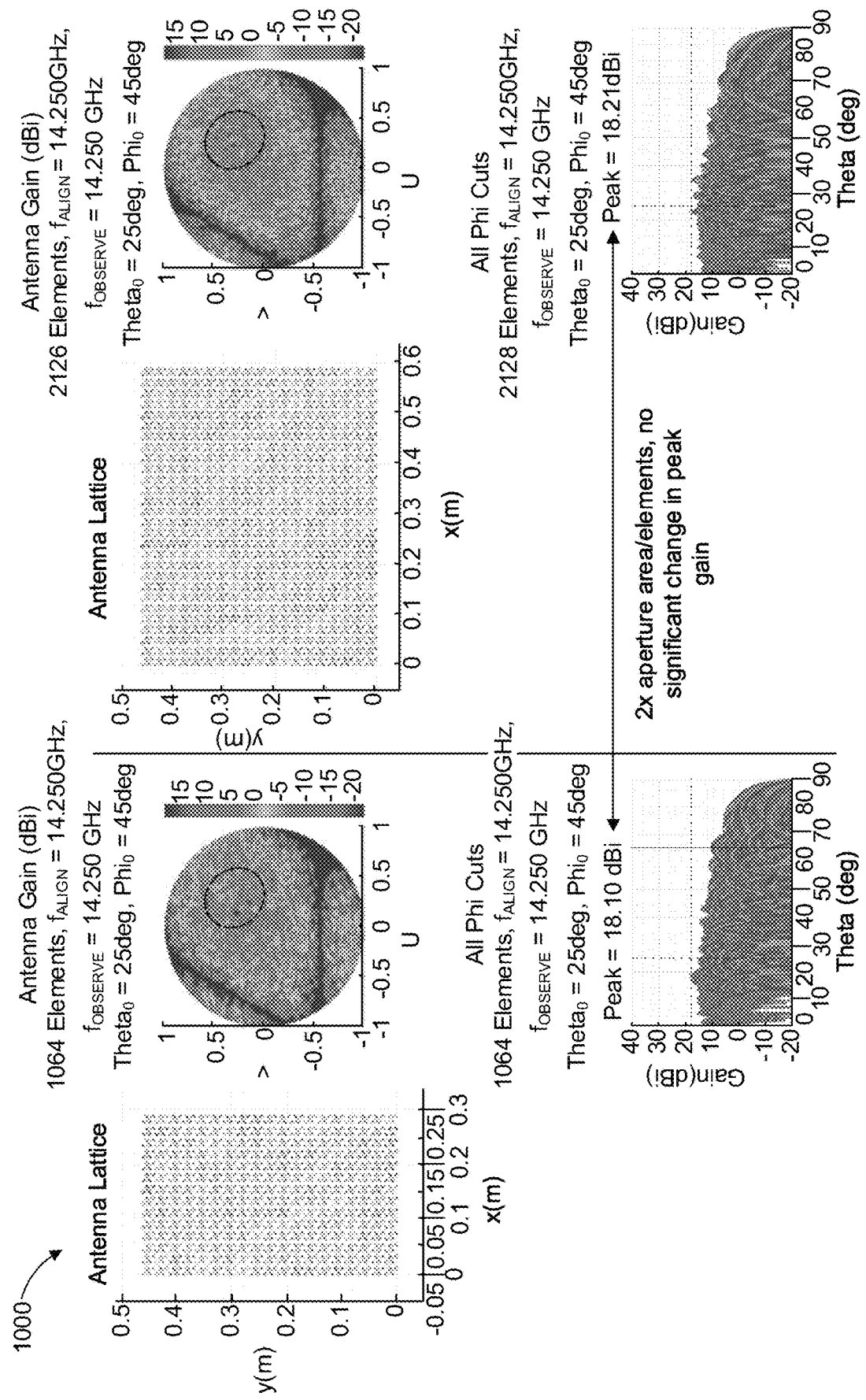
FIG. 10 is a chart illustrating a local oscillator feedthrough gain pattern associated with a digital beamforming scrambling process, in accordance with some examples of the present disclosure.

FIG. 10 illustrates an example chart 1000 showing a LOFT gain pattern associated with a DBF scrambling process. In some examples, the DBF scrambling can be according to Equations 12-13 described above. The LOFT gain pattern shown can be based on a 2× aperture area.

In some cases, another example DBF scrambling process can be based on the following equations:

$$\varphi_{SCRAMBLE} = rand\{\text{uniform}, [0, 2\pi)\}; \quad \text{Equation (24)}$$

$$\mathring{W}_{DBF} = e^{j\varphi_{SCRAMBLE}}$$

$$W_{FE\{n\},\{m\}} = \frac{W_{BF,FE\{n\},\{m\}}}{\mathring{W}_{DBF}}\left(e^{-j\varphi_{cal,DM,FE\{n\},\{m\}}}\right); \quad \text{Equation (25)}$$

$$W_{DBF} = \mathring{W}_{DBF}\left(e^{-j\varphi_{cal,CM}}\right)$$

In some examples, the $\mathring{W}_{DBF}$ phase spread can suppress DAC QE correlation, over-the-air (e.g., phase-shift of common baseband signal into DAC is can be well distributed over 0-360 degrees across DBF paths). The "random" $\mathring{W}_{DBF}$ term in $W_{FE\{n\},\{m\}}$ can mitigate FE coupling impacts (e.g., the aggressor-victim phase relationship can be randomized), and can enforce "random-phasing" of LOFT.

In some cases, an example scrambling process can distribute offsets between the analog BF (ABF) and the digital BF (DBF). In some examples, an example DBF scrambling process can be based on the following equations:

$$\varphi_{SCRAMBLE} = rand\{\text{uniform}, [0, 2\pi)\}; \quad \text{Equation (26)}$$

$$\mathring{W}_{DBF} = e^{j\varphi_{SCRAMBLE}}$$

$$W_{FE\{n\},\{m\}} = \frac{W_{BF,FE\{n\},\{m\}}}{\mathring{W}_{DBF}}\left(e^{-j\varphi_{cal,DM,FE\{n\},\{m\}}}\right); \quad \text{Equation (27)}$$

$$W_{DBF} = \mathring{W}_{DBF}\left(e^{-j\varphi_{cal,CM,DBF}}\right)$$

$$e^{-j\varphi_{cal,CM}} = \left(e^{-j\varphi_{cal,CM,ABF}}\right)e^{-j\varphi_{cal,CM,DBF}} \quad \text{Equation (28)}$$

FIG. 11 is a flowchart illustrating an example method 1100 for selecting hybrid beamforming weights for hybrid beamforming. At block 1102, the method 1100 can include determining digital beamforming weights associated with a plurality of digital beamforming paths between digital beamformers and groups of analog beamforming circuits in a phased array antenna.

In some examples, each digital beamforming path can be directly or indirectly coupled to a group of analog beamforming circuits from the groups of analog beamforming circuits. Moreover, each analog beamforming circuit from the group of analog beamforming circuits can be coupled to a respective set of antenna elements of the phased array antenna. In some cases, the phased array antenna can include a hybrid beamforming architecture.

At block 1104, the method 1100 can include determining analog beamforming weights associated with the groups of analog beamforming circuits. In some examples, the analog beamforming weights can include inverses of the digital beamforming weights. For example, the analog beamforming weights can cancel and/or compensate the digital beamforming weights.

In some examples, each digital beamforming path can be coupled to a set of analog beamforming paths corresponding to each analog beamforming circuit in each group of analog beamforming circuits.

At block 1106, the method 1100 can include determining calibration offsets estimated to put analog beamforming paths associated with the groups of analog beamforming circuits in a desired phase and gain relationship (phase-aligned and gain-aligned) with each other. The calibration offsets can be used to modify the digital beamforming weights or the analog beamforming weights. In some examples, the modified digital or analog beamforming weights can vary or randomize the signal phases and/or phase shifts across the analog beamforming paths and/or the digital beamforming paths. In some examples, the scrambling techniques described herein can "split-up" the calibration offset between analog and digital (e.g., subtract "X" from one, add "X" to the other) in a way to vary or randomize the signal phases (e.g., "X" is random or varied) across the analog beamforming paths and/or the digital beamforming paths. This can provide coupling mitigation, random LOFT phasing, and/or QN suppression.

At block 1108, the method 1100 can include varying, based at least partly on the calibration offsets, a signal phase shift across the analog beamforming paths associated with the groups of analog beamforming circuits. In some examples, varying the signal phase shift across the analog beamforming paths can include randomizing the signal phase shift across the analog beamforming paths.

In some cases, varying the signal phase shift across the analog beamforming paths can include modifying the digital beamforming weights based on the calibration offsets; applying, by the digital beamformers, the modified digital beamforming weights to signals routed through the plurality of digital beamforming paths; and after applying the modified digital beamforming weights to signals routed through the plurality of digital beamforming paths, applying, by the groups of analog beamforming circuits, the analog beamforming weights to the signals.

In some cases, varying the signal phase shift across the analog beamforming paths can include applying, by the digital beamformers, the digital beamforming weights to signals routed through the plurality of digital beamforming paths; modifying the analog beamforming weights based on the calibration offsets; and after applying the digital beamforming weights to signals routed through the plurality of digital beamforming paths, applying, by the groups of analog beamforming circuits, the modified analog beamforming weights to the signals.

In some examples, varying the signal phase shift across the analog beamforming paths can include varying or randomizing one or more common-mode signal phase shifts between the analog beamforming paths and/or the groups of analog beamforming circuits. In some examples, varying the signal phase shift across the analog beamforming paths comprises varying or randomizing signal phase shifts on different signals processed through the set of analog beamforming paths.

In some cases, varying the signal phase shift across the analog beamforming paths can include varying or randomizing the inverses of the digital beamforming weights and respective signal phase shifts associated with the varied or randomized inverses.

In some examples, the method 1100 may be performed by one or more computing devices or apparatuses. In one illustrative example, the method can be performed by a user terminal or SAT shown in FIG. 1A and/or one or more computing devices with the computing device architecture 1200 shown in FIG. 12. In some cases, such a computing device or apparatus may include a processor, microprocessor, microcomputer, or other component of a device that is configured to carry out the steps of the method 1100. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 1100 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement various techniques described herein. For example, the computing device architecture 1200 can be used to implement at least some portions of the SATs 102, the SAGs 104, the user terminals 112 and/or the user network devices 114 shown in FIG. 1A, and perform at least some cross-coupling modeling and/or compensation operations described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service stored in storage device 1230 and configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device. In some instances, multimodal computing devices can enable a user to provide multiple types of input to communicate with the computing device architecture 1200. The communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include software, code, firmware, etc., for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software.

Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method comprising: determining digital beamforming weights associated with a plurality of digital beamforming paths between digital beamformers and groups of analog beamforming circuits in a phased array antenna, wherein each digital beamforming path is coupled to a group of analog beamforming circuits from the groups of analog beamforming circuits, and wherein each analog beamforming circuit from the group of analog beamforming circuits is coupled to a respective set of antenna elements of the phased array antenna; determining analog beamforming weights associated with the groups of analog beamforming circuits, wherein the analog beamforming weights comprise inverses of the digital beamforming weights; determining calibration offsets estimated to put analog beamforming paths associated with the groups of analog beamforming circuits in a desired phase and gain relationship with each other; and varying, based at least partly on the calibration offsets, a signal phase shift across the analog beamforming paths associated with the groups of analog beamforming circuits.

Aspect 2: The method of Aspect 1, wherein varying the signal phase shift across the analog beamforming paths comprises randomizing the signal phase shift across the analog beamforming paths.

Aspect 3: The method of any of Aspects 1 or 2, wherein varying the signal phase shift across the analog beamforming paths comprises: modifying the digital beamforming weights based on the calibration offsets; applying, by the digital beamformers, the modified digital beamforming weights to signals routed through the plurality of digital beamforming paths; and after applying the modified digital beamforming weights to signals routed through the plurality of digital beamforming paths, applying, by the groups of analog beamforming circuits, the analog beamforming weights to the signals.

Aspect 4: The method of any of Aspects 1 or 2, wherein varying the signal phase shift across the analog beamforming paths comprises: applying, by the digital beamformers, the digital beamforming weights to signals routed through the plurality of digital beamforming paths; modifying the analog beamforming weights based on the calibration offsets; and after applying the digital beamforming weights to signals routed through the plurality of digital beamforming paths, applying, by the groups of analog beamforming circuits, the modified analog beamforming weights to the signals.

Aspect 5: The method of any of Aspects 1 to 4, wherein varying the signal phase shift across the analog beamforming paths comprises varying or randomizing one or more common-mode signal phase shifts between at least one of the analog beamforming paths and the groups of analog beamforming circuits.

Aspect 6: The method of any of Aspects 1 to 5, wherein each digital beamforming path is coupled to a set of analog beamforming paths corresponding to each analog beamforming circuit in each group of analog beamforming circuits.

Aspect 7: The method of Aspect 6, wherein varying the signal phase shift across the analog beamforming paths comprises varying or randomizing signal phase shifts on different signals processed through the set of analog beamforming paths.

Aspect 8: The method of any of Aspects 1 to 7, wherein varying the signal phase shift across the analog beamforming paths comprises varying or randomizing the inverses of the digital beamforming weights and respective signal phase shifts associated with the varied or randomized inverses.

Aspect 9: The method of any of Aspects 1 to 8, wherein the phased array antenna comprises a hybrid beamforming architecture.

Aspect 10: A phased array antenna comprising: digital beamformers; a plurality of analog beamforming circuits; a plurality of antenna elements; and one or more processing devices configured to: determine digital beamforming weights associated with a plurality of digital beamforming paths between the digital beamformers and groups of analog beamforming circuits from the plurality of analog beamforming circuits, wherein each digital beamforming path is coupled to a group of analog beamforming circuits, and wherein each analog beamforming circuit from the group of analog beamforming circuits is coupled to a respective set of antenna elements from the plurality of antenna elements; determine analog beamforming weights associated with the groups of analog beamforming circuits, wherein the analog beamforming weights comprise inverses of the digital beamforming weights; determine calibration offsets estimated to vary put analog beamforming paths associated with the groups of analog beamforming circuits in a desired phase and gain relationship with each other; and vary, based at least partly on the calibration offsets, a signal phase shift across the analog beamforming paths associated with the groups of analog beamforming circuits.

Aspect 11: The phased array antenna of Aspect 10, wherein varying the signal phase shift across the analog beamforming paths comprises randomizing the signal phase shift across the analog beamforming paths.

Aspect 12: The phased array antenna of any of Aspects 10 or 11, wherein varying the signal phase shift across the analog beamforming paths comprises: modifying the digital beamforming weights based on the calibration offsets; applying, by the digital beamformers, the modified digital beamforming weights to signals routed through the plurality of digital beamforming paths; and after applying the modified digital beamforming weights to signals routed through the plurality of digital beamforming paths, applying, by the groups of analog beamforming circuits, the analog beamforming weights to the signals.

Aspect 13: The phased array antenna of any of Aspects 10 or 11, wherein varying the signal phase shift across the analog beamforming paths comprises: applying, by the digital beamformers, the digital beamforming weights to signals routed through the plurality of digital beamforming paths; modifying the analog beamforming weights based on the calibration offsets; and after applying the digital beamforming weights to signals routed through the plurality of digital beamforming paths, applying, by the groups of analog beamforming circuits, the modified analog beamforming weights to the signals.

Aspect 14: The phased array antenna of any of Aspects 10 to 13, wherein varying the signal phase shift across the analog beamforming paths comprises varying or randomizing one or more common-mode signal phase shifts between at least one of the analog beamforming paths and the groups of analog beamforming circuits.

Aspect 15: The phased array antenna of any of Aspects 10 to 14, wherein each digital beamforming path is coupled to a set of analog beamforming paths corresponding to each analog beamforming circuit in each group of analog beamforming circuits.

Aspect 16: The phased array antenna of Aspect 15, wherein varying the signal phase shift across the analog beamforming paths comprises varying or randomizing signal phase shifts of different signals processed through the set of analog beamforming paths.

Aspect 17: The phased array antenna of any of Aspects 10 to 16, wherein varying the signal phase shift across the analog beamforming paths comprises varying or randomizing the inverses of the digital beamforming weights and respective signal phase shifts associated with the varied or randomized inverses.

Aspect 18: The phased array antenna of any of Aspects 10 to 17, wherein the phased array antenna comprises a hybrid beamforming architecture.

Aspect 19: A non-transitory computer-readable medium having stored thereon instructions that, when executed by one or more processing devices, cause the one or more processing devices to: determine digital beamforming weights associated with a plurality of digital beamforming paths between digital beamformers and groups of analog beamforming circuits in a phased array antenna, wherein each digital beamforming path is coupled to a group of analog beamforming circuits from the groups of analog beamforming circuits, and wherein each analog beamforming circuit from the group of analog beamforming circuits is coupled to a respective set of antenna elements of the phased array antenna; determine analog beamforming weights associated with the groups of analog beamforming circuits, wherein the analog beamforming weights comprise inverses of the digital beamforming weights; determine calibration offsets estimated to put analog beamforming paths associated with the groups of analog beamforming circuits in a desired phase and gain relationship to each other; and vary, based at least partly on the calibration offsets, a signal phase shift across the analog beamforming paths associated with the groups of analog beamforming circuits.

Aspect 20: The non-transitory computer-readable medium of Aspect 19, wherein varying the signal phase shift across the analog beamforming paths comprises randomizing the signal phase shift across the analog beamforming paths.

Aspect 21: The non-transitory computer-readable medium of any of Aspects 19 or 20, wherein varying the signal phase shift across the analog beamforming paths comprises: modifying the digital beamforming weights based on the calibration offsets; applying, by the digital beamformers, the modified digital beamforming weights to signals routed through the plurality of digital beamforming paths; and after applying the modified digital beamforming weights to signals routed through the plurality of digital beamforming paths, applying, by the groups of analog beamforming circuits, the analog beamforming weights to the signals.

Aspect 22: The non-transitory computer-readable medium of any of Aspects 19 or 20, wherein varying the signal phase shift across the analog beamforming paths comprises: applying, by the digital beamformers, the digital beamforming weights to signals routed through the plurality of digital beamforming paths; modifying the analog beamforming weights based on the calibration offsets; and after applying the digital beamforming weights to signals routed through the plurality of digital beamforming paths, applying, by the groups of analog beamforming circuits, the modified analog beamforming weights to the signals.

Aspect 23: The non-transitory computer-readable medium of any of Aspects 19 to 22, wherein varying the signal phase shift across the analog beamforming paths comprises varying or randomizing one or more common-mode signal phase shifts between at least one of the analog beamforming paths and the groups of analog beamforming circuits.

Aspect 24: The non-transitory computer-readable medium of any of Aspects 19 to 23, wherein each digital beamforming path is coupled to a set of analog beamforming paths corresponding to each analog beamforming circuit in each group of analog beamforming circuits.

Aspect 25: The non-transitory computer-readable medium of Aspect 24, wherein varying the signal phase shift across the analog beamforming paths comprises varying or randomizing phase shifts of different signals processed through the set of analog beamforming paths.

Aspect 26: The non-transitory computer-readable medium of any of Aspects 19 to 25, wherein varying the signal phase shift across the analog beamforming paths comprises varying or randomizing the inverses of the digital beamforming weights and respective signal phase shifts associated with the varied or randomized inverses.

Aspect 27: The non-transitory computer-readable medium of any of Aspects 19 to 26, wherein the phased array antenna comprises a hybrid beamforming architecture.

Aspect 28: A system comprising means for performing a method according to any of Aspects 1 to 9.

What is claimed is:

1. A method comprising:
   determining a plurality of digital beamforming weights associated with a plurality of digital beamforming paths between digital beamformers and groups of analog beamforming circuits in a phased array antenna, wherein:
     each digital beamforming path is coupled to a respective group of analog beamforming circuits from the groups of analog beamforming circuits; and
     each analog beamforming circuit from each respective group of analog beamforming circuits is coupled to a respective set of antenna elements of the phased array antenna; and
   determining analog beamforming weights associated with the groups of analog beamforming circuits, wherein the analog beamforming weights are estimated to put analog beamforming paths associated with the groups of analog beamforming circuits in a desired phase and gain relationship with each other.

2. The method of claim 1, further comprising varying, based at least partly on the analog beamforming weights, a signal phase shift across the analog beamforming paths associated with the groups of analog beamforming circuits, wherein varying the signal phase shift across the analog beamforming paths comprises randomizing the signal phase shift across the analog beamforming paths.

3. The method of claim 2, wherein varying the signal phase shift across the analog beamforming paths comprises varying or randomizing one or more common-mode signal phase shifts between at least one of the analog beamforming paths and the groups of analog beamforming circuits.

4. The method of claim 2 wherein each digital beamforming path is coupled to a set of analog beamforming paths corresponding to each analog beamforming circuit in each group of analog beamforming circuits.

5. The method of claim 4, wherein varying the signal phase shift across the analog beamforming paths comprises varying or randomizing signal phase shifts on different signals processed through the set of analog beamforming paths.

6. The method of claim 1, wherein the plurality of digital beamforming weights comprise one or more calibration offsets associated with the groups of analog beamforming circuits.

7. The method of claim 1, wherein the analog beamforming weights comprise one or more calibration offsets associated with the groups of analog beamforming circuits.

8. The method of claim 1, wherein the analog beamforming weights are applied to local oscillator feed through signals at the groups of analog beamforming circuits.

9. The method of claim 1, wherein a digital beamforming path of the plurality of digital beamforming paths is coupled to a distribution network, and wherein the distribution network couples the digital beamforming path of the plurality of digital beamforming paths to a respective group of analog beamforming circuits.

10. The method of claim 9, wherein the distribution network comprises one or more 2:1 splitter/combiner elements.

11. A phased array antenna comprising:
    one or more digital beamformers;
    a plurality of analog beamforming circuits;
    a plurality of antenna elements; and
    one or more processing devices configured to:
      determine a plurality of digital beamforming weights associated with a plurality of digital beamforming paths between the one or more digital beamformers and groups of analog beamforming circuits from the plurality of analog beamforming circuits, wherein:
        each digital beamforming path is coupled to a respective group of analog beamforming circuits; and
        each analog beamforming circuit from each respective group of analog beamforming circuits is coupled to a respective set of antenna elements from the plurality of antenna elements; and
      determine analog beamforming weights associated with the groups of analog beamforming circuits, wherein the analog beamforming weights are estimated to put analog beamforming paths associated with the groups of analog beamforming circuits in a desired phase and gain relationship with each other.

12. The phased array antenna of claim 11, wherein the one or more processing devices are configured to vary, based at least partly on the analog beamforming weights, a signal phase shift across the analog beamforming paths associated with the groups of analog beamforming circuits, wherein varying the signal phase shift across the analog beamforming paths comprises randomizing the signal phase shift across the analog beamforming paths.

13. The phased array antenna of claim 12, wherein varying the signal phase shift across the analog beamforming paths comprises varying or randomizing one or more common-mode signal phase shifts between at least one of the analog beamforming paths and the groups of analog beamforming circuits.

14. The phased array antenna of claim 12, wherein each digital beamforming path is coupled to a set of analog beamforming paths corresponding to each analog beamforming circuit in each group of analog beamforming circuits.

15. The phased array antenna of claim 14, wherein varying the signal phase shift across the analog beamforming paths comprises varying or randomizing signal phase shifts of different signals processed through the set of analog beamforming paths.

16. The phased array antenna of claim 11, wherein the plurality of digital beamforming weights comprise one or more calibration offsets associated with the groups of analog beamforming circuits.

17. The phased array antenna of claim 11, wherein the analog beamforming weights comprise one or more calibration offsets associated with the groups of analog beamforming circuits.

18. The phased array antenna of claim 11, wherein the analog beamforming weights are applied to local oscillator feed through signals at the groups of analog beamforming circuits.

19. The phased array antenna of claim 11, wherein a digital beamforming path of the plurality of digital beamforming paths is coupled to a distribution network, and wherein the distribution network couples the digital beamforming path of the plurality of digital beamforming paths to a respective group of analog beamforming circuits.

20. The phased array antenna of claim 19, wherein the distribution network comprises one or more 2:1 splitter/combiner elements.

21. A non-transitory computer-readable medium having stored thereon instructions that, when executed by one or more processing devices, cause the one or more processing devices to:
  determine a plurality of digital beamforming weights associated with a plurality of digital beamforming paths between digital beamformers and groups of analog beamforming circuits in a phased array antenna, wherein:
    each digital beamforming path is coupled to a group of analog beamforming circuits from the groups of analog beamforming circuits; and
    each analog beamforming circuit from the group of analog beamforming circuits is coupled to a respective set of antenna elements of the phased array antenna;
  determine analog beamforming weights associated with the groups of analog beamforming circuits, wherein the analog beamforming weights are estimated to put analog beamforming paths associated with the groups of analog beamforming circuits in a desired phase and gain relationship with each other; and
  vary, based at least partly on the analog beamforming weights, a signal phase shift across the analog beamforming paths associated with the groups of analog beamforming circuits.

22. The non-transitory computer-readable medium of claim 21, wherein varying the signal phase shift across the analog beamforming paths comprises randomizing the signal phase shift across the analog beamforming paths.

23. The non-transitory computer-readable medium of claim 21, wherein the plurality of digital beamforming weights comprise one or more calibration offsets associated with the groups of analog beamforming circuits.

24. The non-transitory computer-readable medium of claim 21, wherein varying the signal phase shift across the analog beamforming paths comprises varying or randomizing one or more common-mode signal phase shifts between at least one of the analog beamforming paths and the groups of analog beamforming circuits.

* * * * *